US011558555B2

(12) United States Patent
Lee et al.

(10) Patent No.: US 11,558,555 B2
(45) Date of Patent: Jan. 17, 2023

(54) MOBILE TERMINAL AND METHOD FOR CONTROLLING SAME

(71) Applicant: LG ELECTRONICS INC., Seoul (KR)

(72) Inventors: Changhwan Lee, Seoul (KR); Yunsup Shin, Seoul (KR); Salkmann Ji, Seoul (KR); Yungwoo Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 17/167,011

(22) Filed: Feb. 3, 2021

(65) Prior Publication Data

US 2022/0103741 A1 Mar. 31, 2022

(30) Foreign Application Priority Data

Sep. 25, 2020 (WO) ................ PCT/KR2020/013078

(51) Int. Cl.
*H04N 5/235* (2006.01)
*G06V 10/40* (2022.01)
*G06V 10/143* (2022.01)
*G06V 10/145* (2022.01)
*H04W 88/02* (2009.01)

(52) U.S. Cl.
CPC ......... *H04N 5/2354* (2013.01); *G06V 10/143* (2022.01); *G06V 10/145* (2022.01); *G06V 10/40* (2022.01); *H04W 88/02* (2013.01)

(58) Field of Classification Search
CPC .................................................. H04N 5/2354
USPC ........................................................ 348/370
See application file for complete search history.

(56) References Cited

U.S. PATENT DOCUMENTS

2018/0191879 A1 7/2018 Evans
2018/0343438 A1* 11/2018 Cho ................... H04N 13/254

FOREIGN PATENT DOCUMENTS

| CN | 107561040 | * | 1/2018 |
| EP | 3407601 | | 11/2018 |
| KR | 20160149068 | | 12/2016 |
| KR | 101809133 | | 12/2017 |
| KR | 20180042718 | | 4/2018 |
| KR | 101857977 | | 5/2018 |
| WO | 9958930 | | 11/1999 |

OTHER PUBLICATIONS

European Patent Office Application Serial No. 21152747.8, Search Report dated May 25, 2021, 27 pages.
PCT International Application No. PCT/KR2020/013078, International Search Report dated Jun. 25, 2021, 8 pages.

* cited by examiner

*Primary Examiner* — Joel W Fosselman
(74) *Attorney, Agent, or Firm* — Lee Hong Degerman Kang & Waimey

(57) ABSTRACT

The present disclosure relates to a mobile terminal having a lighting unit and a control method thereof. A mobile terminal according to one implementation includes a lighting unit, a camera, and a controller configured to control the lighting unit to irradiate illumination light to a subject to be captured through the camera, and control the camera to capture the subject irradiated with the illumination light, wherein the controller is configured to determine a material of the subject based on information related to the illumination light irradiated on the subject captured through the camera.

17 Claims, 24 Drawing Sheets

(a)　　　　　　　　　　　(b)

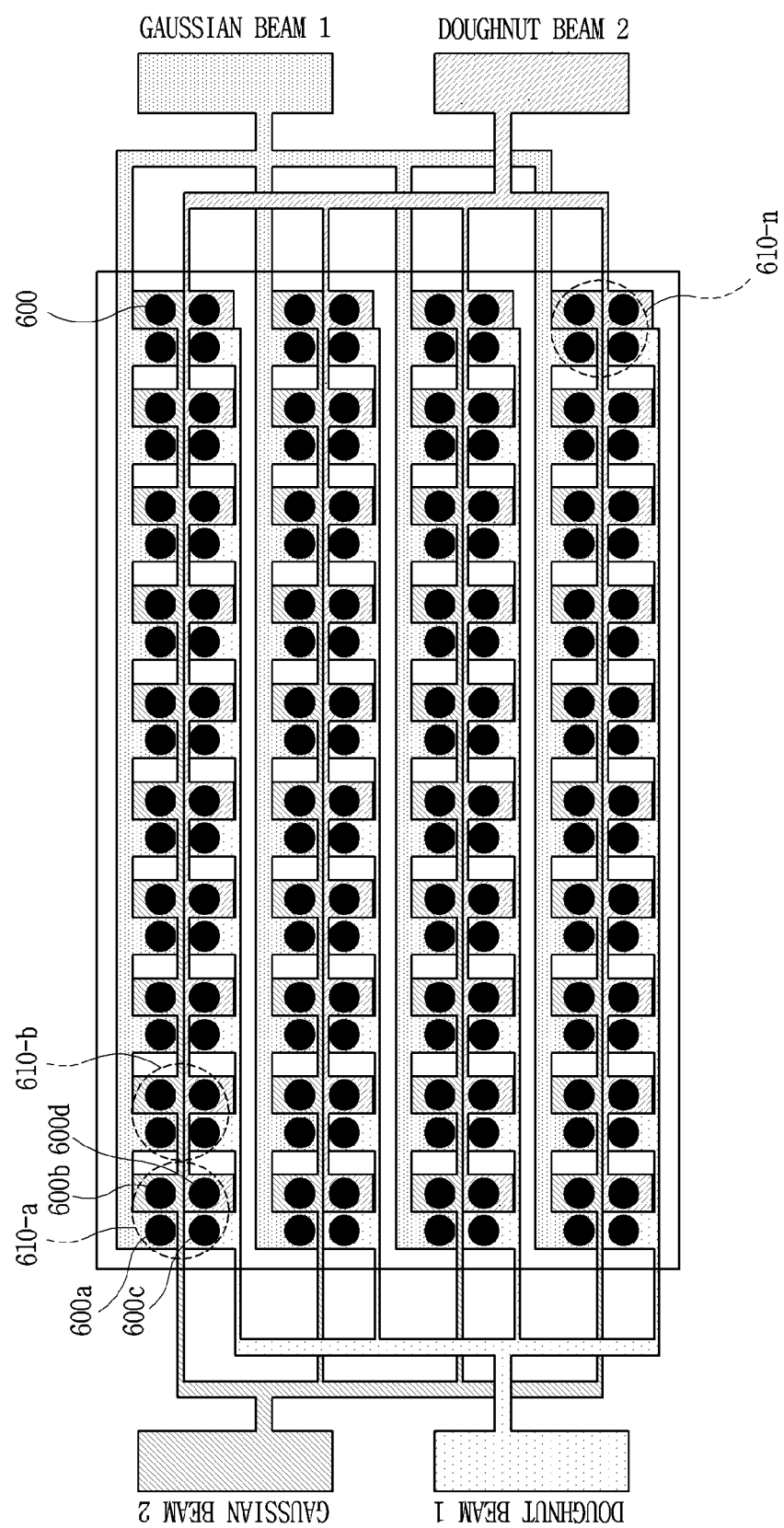

FIG. 13A
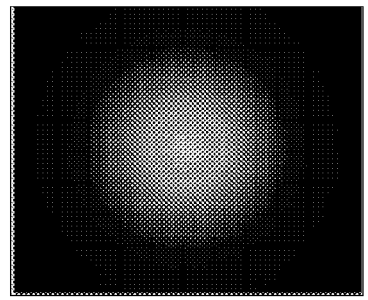 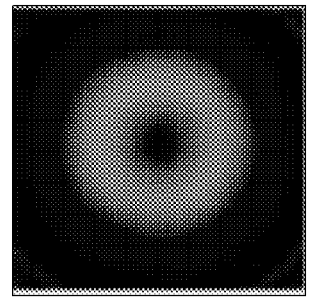
(a) EXAMPLE OF GAUSSIAN BEAM    (b) EXAMPLE OF DOUGHNUT BEAM FIG. 13B
(a)
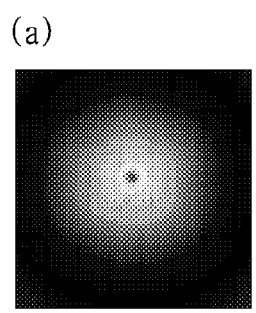
BEAM PROFILE
OF MATERIAL 1
(b)
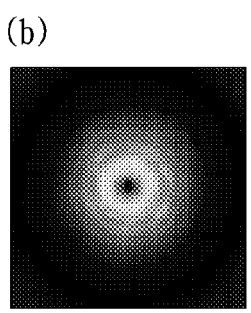
BEAM PROFILE
OF MATERIAL 2
(c)
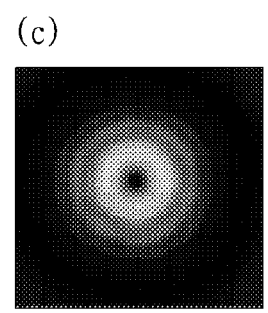
BEAM PROFILE
OF MATERIAL 3
(d)
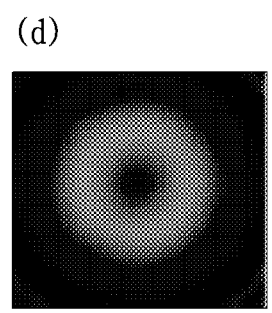
BEAM PROFILE
OF MATERIAL 4

FIG. 15
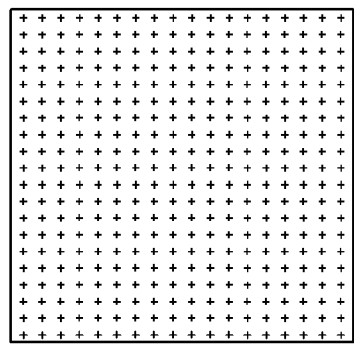 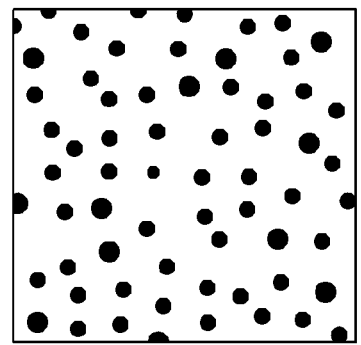
(a) EXAMPLE OF CROSS PATTERN    (b) EXAMPLE OF SPOT PATTERN FIG. 17
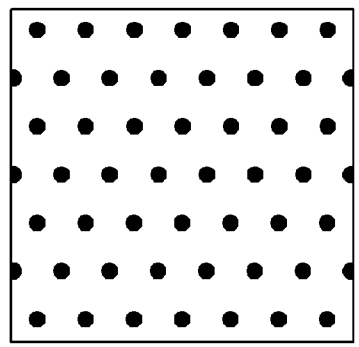
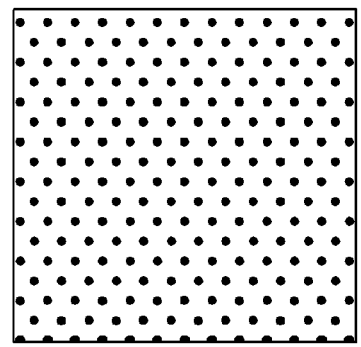
(a) CIRCULAR PATTERN 1
- LARGE SIZE
(b) CIRCULAR PATTERN 4
- SMALL SIZE FIG. 20
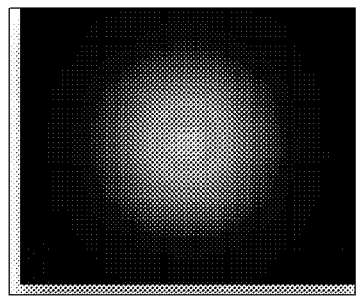 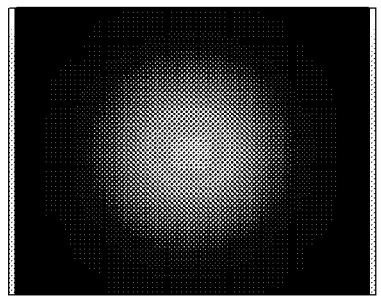 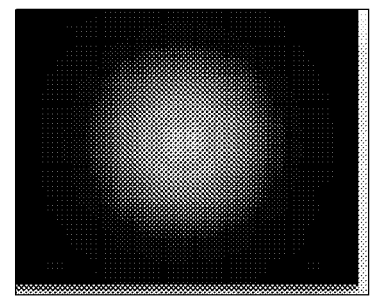
(a) MATERIAL 1      (b) MATERIAL 2      (c) MATERIAL 3

MOBILE TERMINAL AND METHOD FOR CONTROLLING SAME

CROSS-REFERENCE TO RELATED APPLICATIONS

Pursuant to 35 U.S.C. § 119 (a), this application claims the benefit of an earlier filing date and right of priority to International Application No. PCT/KR2020/013078 filed on Sep. 25, 2020, the contents of which are hereby incorporated by reference herein in its entirety.

TECHNICAL FIELD

The present disclosure relates to a mobile terminal having a lighting device, and more particularly, to a mobile terminal having a lighting device used for recognizing depth information related to an image or a material of a subject to be captured.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Recently, as performance of cameras has advanced, various functions using cameras have been developed. For example, development of functions to capture a high quality still image or video or generate a 3D image using depth information (or a depth value) of an image received through a camera have been actively developed.

For those various functions using cameras, a role of a light emitting element is important. Here, the light-emitting element serves to emit light to a space corresponding to an image received through a camera.

Thus, the necessity to develop a light emitting element for performing various functions using a camera and a method for controlling a light emitting element have emerged.

DISCLOSURE

Technical Problem

Therefore, an aspect of the present disclosure is to provide a mobile terminal having a lighting (or illumination) capable of irradiating light, which is used for extracting depth information related to an image captured through a camera, in an optimized manner, and a method for controlling the same.

Another aspect of the present disclosure is to provide a mobile terminal having a lighting (or illumination) capable of irradiating light, which is used for extracting a material of a subject to be captured through a camera, in an optimized manner, and a method for controlling the same.

Technical Solution

A mobile terminal may include a lighting unit, a camera, and a controller configured to control the lighting unit to irradiate illumination light on a subject to be captured through the camera, and control the camera to capture the subject irradiated with the illumination light. The controller may be configured to determine a material of the subject based on information related to the illumination light irradiated on the subject captured through the camera.

In an implementation, the lighting unit may include a first light source configured to irradiate pattern light, and a second light source configured to irradiate uniform light.

In an implementation, the controller may turn on the first light source and the second light source alternately.

In an implementation, the controller may turn off the second light source when the first light source is turned on for a first period of time, and turn off the first light source when the second light source is turned on for a second period of time after the first period of time elapses.

In an implementation, the first light source may include a plurality of light-emitting elements. The plurality of light-emitting elements may be grouped into a plurality of groups. Each of the plurality of groups may include the same number of light-emitting elements.

In an implementation, the controller may control the light-emitting elements included in the plurality of groups in a preset manner.

In an implementation, the controller may control the lighting unit such that a first light-emitting element and a second light-emitting element included in each of the plurality of groups output light of different wavelengths.

In an implementation, the controller may group the plurality of groups into a plurality of units, and control the lighting unit to emit light without an overlap for each unit.

In an implementation, each of the plurality of units may include the same number of groups. While controlling one of the plurality of units, the controller may control the lighting unit such that the light-emitting elements included in the remaining units do not emit light.

In an implementation, the controller may control the lighting unit such that a first light-emitting element and a second light-emitting element included in each of the plurality of groups output light with different power.

In an implementation, the controller may control all of the plurality of light-emitting elements to emit light with different power on the time basis.

In an implementation, the controller may control all of the plurality of light-emitting elements to emit light with first power for a first period of time, and control all of the plurality of light-emitting elements to emit light with second power different from the first power for a second period of time after the first period of time elapses.

In an implementation, the controller may group the plurality of light-emitting elements into a plurality of units, and control the lighting unit to emit light with different power on the time basis for each of the plurality of units.

In an implementation, the controller may control the lighting unit such that a first light-emitting element and a second light-emitting element included in each of the plurality of groups output light with different beam profiles.

In an implementation, the controller may control the lighting unit such that a first light-emitting element and a second light-emitting element included in each of the plurality of groups output light with different patterns.

In an implementation, the controller may control the lighting unit such that a first light-emitting element and a second light-emitting element included in each of the plurality of groups irradiate light of the same pattern but a size of optical spot is different.

In an implementation, the first light source may include an illumination lens configured to irradiate light of different patterns.

In an implementation, the first light source may include a variable aperture configured to irradiate light of different patterns.

In an implementation, the first light source may include a diffractive optical element configured to irradiate light of different patterns.

A method for controlling a mobile terminal may include controlling a lighting unit to irradiate illumination light to a subject to be captured through a camera, controlling a camera to capture the subject irradiated with the illumination light, and determining a material of the subject based on information related to the illumination light irradiated to the subject captured through the camera.

Advantageous Effects

The present disclosure can provide a new mobile terminal capable of determining a material of a subject to be captured by using illumination.

The present disclosure can provide a new control method capable of determining a material of a subject to be captured in an optimized manner by varying a pattern of illumination.

BRIEF DESCRIPTION OF THE DRAWINGS

FIGS. 6, 7, 8, 9, 10, 11, 12, 13A, 13B, 14, 15, 16, 17, 18, 19, 20, and 21 are conceptual views illustrating a method of controlling illumination (or emitter) that is used by a mobile terminal for recognizing a material of a subject to be captured.

MODES FOR CARRYING OUT THE PREFERRED IMPLEMENTATIONS

Figure 1A:
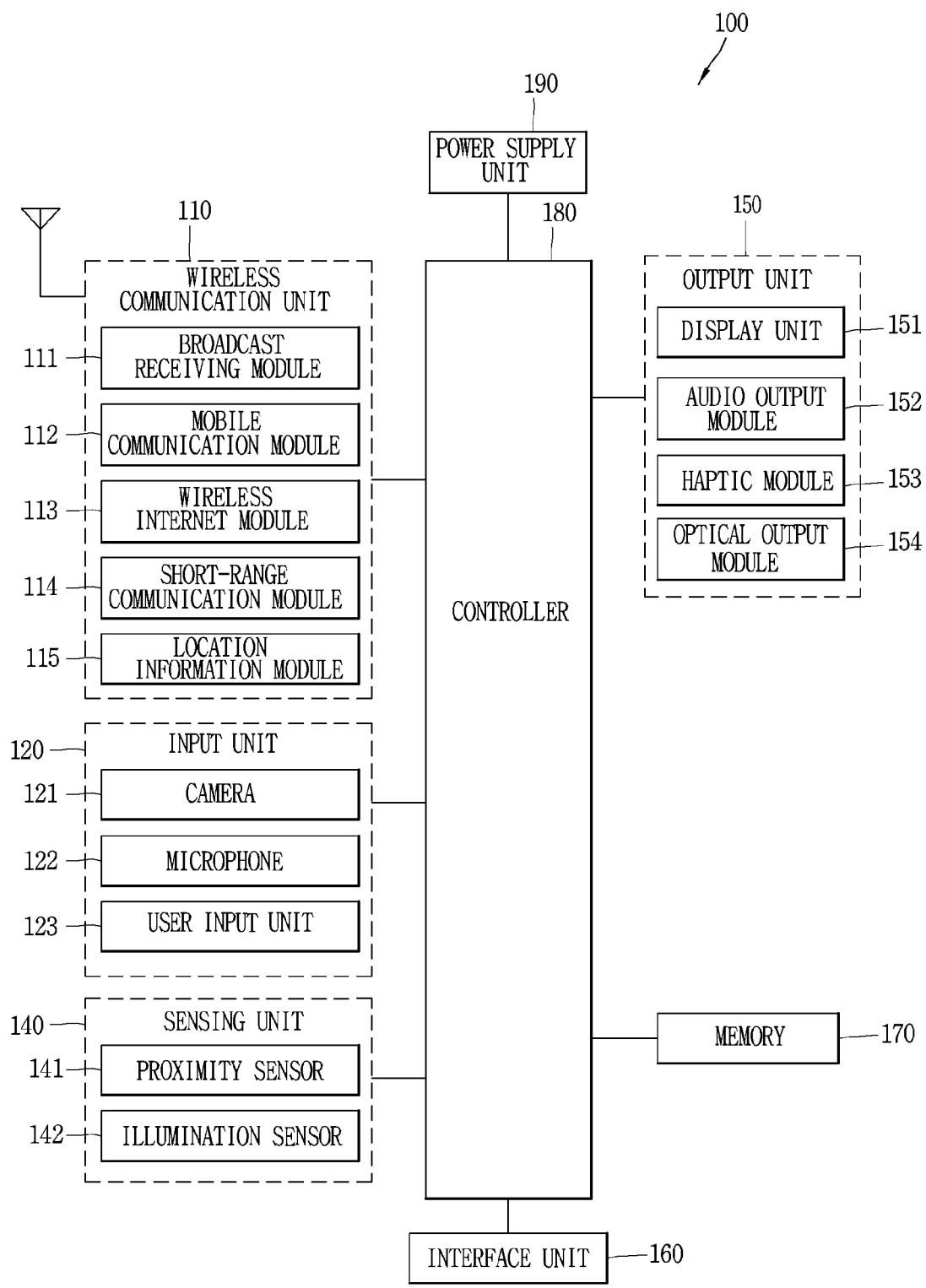
FIG. 1A is a block diagram of a mobile terminal in accordance with one embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
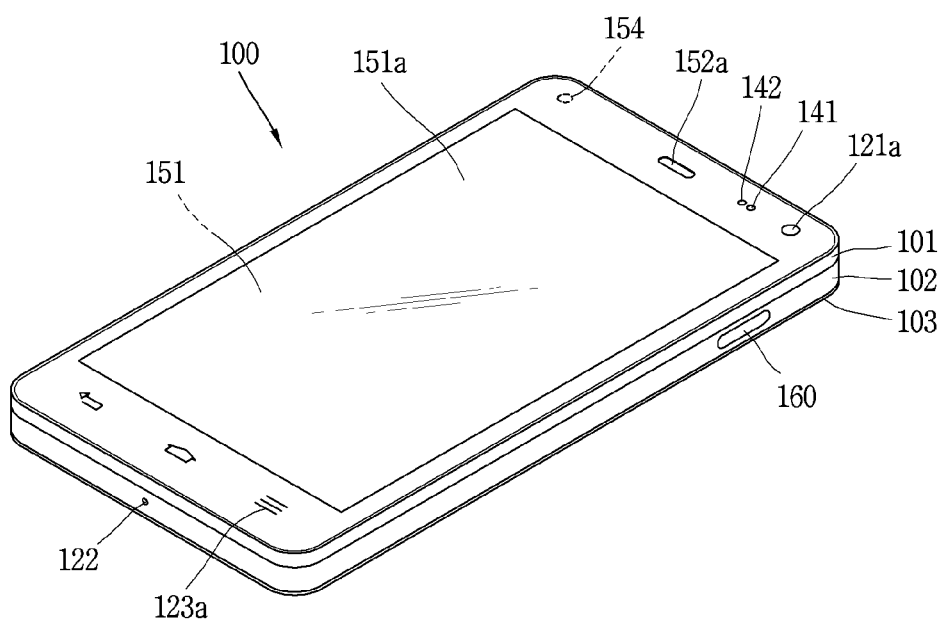
FIGS. 1B and 1C are conceptual views illustrating one example of a mobile terminal according to the present disclosure, viewed from different directions.
Figure 1C:
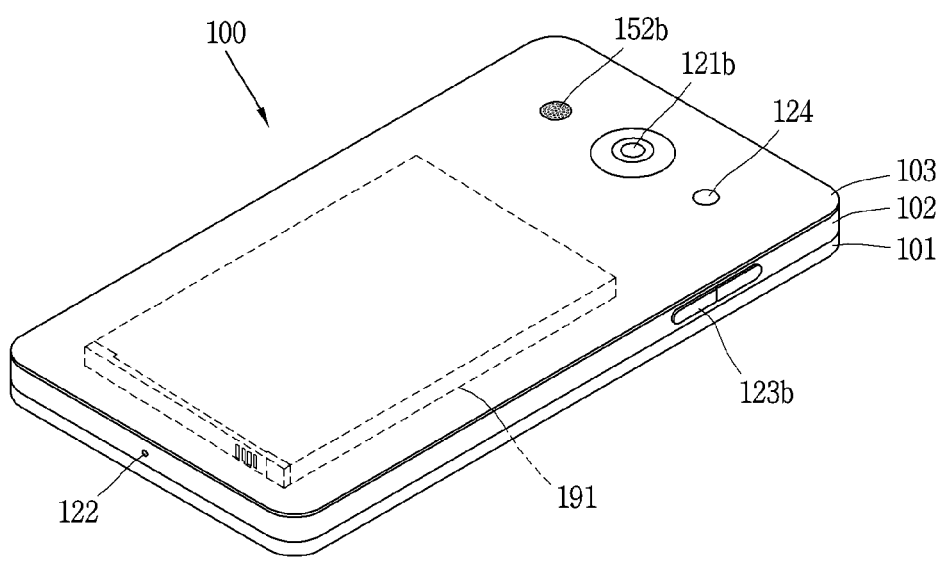

Referring to FIGS. 1A to 1C, FIG. 1A is a block diagram of a mobile terminal in accordance with one implementation of the present disclosure, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSUPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (W-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the HMD 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of those electronic components mounted to the rear case 102 may include a detachable battery, an identification module, a memory card and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121*a* may process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

The drawings are illustrated on the basis that the first manipulation unit 123*a* is a touch key, but the present disclosure may not be necessarily limited to this. For example, the first manipulation unit 123*a* may be configured with a mechanical key, or a combination of a touch key and a push key.

The content received by the first and second manipulation units 123*a* and 123*b* may be set in various ways. For example, the first manipulation unit 123*a* may be used by the user to input a command such as menu, home key, cancel, search, or the like, and the second manipulation unit 123*b* may be used by the user to input a command, such as controlling a volume level being output from the first or second audio output module 152*a* or 152*b*, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152*a* or 152*b*, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123*a* located on the front surface of the terminal body. Accordingly, when the first manipulation unit 123*a* is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be provided at a plurality of places, and configured to receive stereo sounds. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*.

The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained.

The flash 124 may be disposed adjacent to the second camera 121*b*. When an image of a subject is captured with the camera 121*b*, the flash 124 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the electronic device 100. Another example of the accessory may be a touch pen for assisting or extending a touch input onto a touch screen.

Meanwhile, the mobile terminal related to the present disclosure may extract (detect, determine, sense) depth information from an image captured through a camera, using the camera and a lighting device (a lighting unit, a lighting module, etc. which will be used together.

Also, the mobile terminal related to the present disclosure may capture (or generate) a 3D image using the camera and the lighting device. For example, the mobile terminal related to the present disclosure may convert (generate) a 2D image captured through the camera into a 3D image on the basis of the extracted depth information. similar manner. In another example, the mobile terminal related to the present disclosure may determine a distance to a subject on the basis of light irradiated from the lighting device and capture (or generate) a 3D image through the camera on the basis of the distance to the subject.

Hereinafter, a method for extracting depth information from an image captured using the camera and the lighting device will be described in detail with reference to the accompanying drawings. Hereinafter, extracting depth information from an image captured through the camera will be described, but related contents may also be inferred and applied to capturing (or generating a 3D image in the same/like manner.

The mobile terminal 100 related to the present disclosure may extract depth information received (or captured) through the camera 121 (please refer to FIG. 1A).

The image received through the camera may be referred to as a preview image. In detail, the preview image may refer to an image received through the camera in real time. The preview image may be changed as the mobile terminal having the camera 121 is moved by an external force or as a subject moves.

An image captured through the camera may refer to an image obtained by capturing a preview image, for example. For example, the image may be captured as an image capture button output on the display unit of the mobile terminal is touched, as a user's gesture associated to capture a preview image is sensed through the preview image, or as a physical button provided in the mobile terminal is pressed.

An image described in this disclosure may refer to at least one of a preview image and a captured image.

Depth information described in this disclosure may be a depth value. The depth information may refer to a distance (or a distance value) between a subject corresponding pixels included in the image and the mobile terminal (specifically, the camera).

For example, in cases where a subject corresponding to a specific pixel of the image and the mobile terminal is n, depth information of the specific pixel may be a specific value corresponding to n. The specific value corresponding to n may be n or a value converted by a preset algorithm.

Also, the depth information may be a value corresponding to a z axis perpendicular to an x axis and a y axis in cases where coordinates of the image are set to the x axis and the y axis perpendicular to the x axis. An absolute value of the depth information may be increased as a distance between the subject and the mobile terminal is increased.

The depth information may be utilized in various fields. For example, the depth information may be used for capturing/generating a 3D stereoscopic image (stereoscopy), used for generating 3D printing data used in a 3D printer, or used for detecting movement of an object (or subject) around the mobile terminal.

The mobile terminal related to the present disclosure may extract depth information of an image received (or captured) through the camera in various manners. For example, the controller 180 may extract depth information through a stereo vision scheme of extracting depth information using at least two cameras, a structured light scheme of extracting depth information using light-emitting elements disposed to form a preset pattern, a time of flight (ToF) scheme of extracting depth information on the basis of time during which light emitted from a light-emitting element is reflected to be returned, or any combination thereof.

Hereinafter, extracting depth information using the structure light scheme, among the aforementioned schemes, will be largely described.

The structured light scheme is a scheme of emitting light to a subject by controlling a plurality of light-emitting elements disposed to have a preset pattern, sensing light reflected from the subject, and subsequently extracting depth information on the basis of the sensed light (or a pattern of sensed light).

In detail, the structured light scheme is a scheme of extracting depth information by irradiating light to a subject from a plurality of light-emitting elements disposed to have a preset pattern and calculating a shift amount (or a shift amount of a reflected light pattern) of reflected light returned with respect to the preset pattern.

For example, the controller 180 of the mobile terminal related to the present disclosure may control the plurality of light-emitting elements disposed to have a preset pattern to emit light to the subject. Thereafter, the controller 180 of the mobile terminal may sense light reflected and returned from the subject through the sensing unit 140 of FIG. 1A.

Here, the controller 180 may extract depth information of an image received through the camera 121 on the basis of the sensing result. For example, the controller 180 may extract depth information of the image received through the camera 121 by comparing the pattern formed by light which is reflected and returned with the preset pattern.

In detail, the controller 180 may extract depth information of the image received through the camera 121 by comparing a preset pattern in which a plurality of light-emitting elements emits light to the subject (or a preset pattern in which the plurality of light-emitting elements is disposed) and a pattern formed by reflected and returned light (or optical spot) and calculating a shift amount regarding each of the reflected and returned light (or optical spot) with respect to the preset pattern (or a changed form, a changed distance, a changed direction, and the like) or a shift amount regarding a pattern of returned light.

In another example, in the structured light scheme, the controller 180 may extract depth information of the image received through the camera 121 by comparing time during which light emitted from the plurality of light-emitting elements is reflected to be returned and strength of reflected and returned light.

To this end, the plurality of light-emitting elements may be formed to emit light to a space corresponding to the image received through the camera 121.

The preset pattern may be determined (or set) by the user or may be predetermined when a product of the mobile terminal was manufactured. Also, the preset pattern may be changed according to a user request or by controlling of the controller.

Also, the plurality of light-emitting elements may emit infrared light. Also, the light-emitting elements may be laser diodes changing an electrical signal into an optical signal. For example, the light-emitting elements may be a vertical cavity surface emitting laser (VCSEL).

In the present disclosure, depth information of the image may be extracted through one camera (infrared camera or a 3D camera) using the structure light scheme, and even when the subject has a single color, depth information may be extracted. Also, accuracy regarding depth information may be enhanced by combining the structure light scheme and a stereo vision scheme using at least two cameras or combining the structure light scheme and the ToF scheme.

The ToF scheme may be a scheme of measuring depth information of an image by calculating a time during which light directly irradiated on an object is returned as reflected light The stereo vision scheme may be a scheme of symmetrically disposing a plurality of cameras (e.g., two cameras) and extracting depth information of an image received through the camera using disparity (or a difference in distance, space) between an image received through a first camera (e.g., a left camera) among the plurality of cameras and an image received through a second camera (e.g., a right camera) among the plurality of cameras.

The mobile terminal related to the present disclosure may use a stereo vision, a structured light technology, a ToF technology, or a combination of at least two or more of those technologies.

Figure 2:
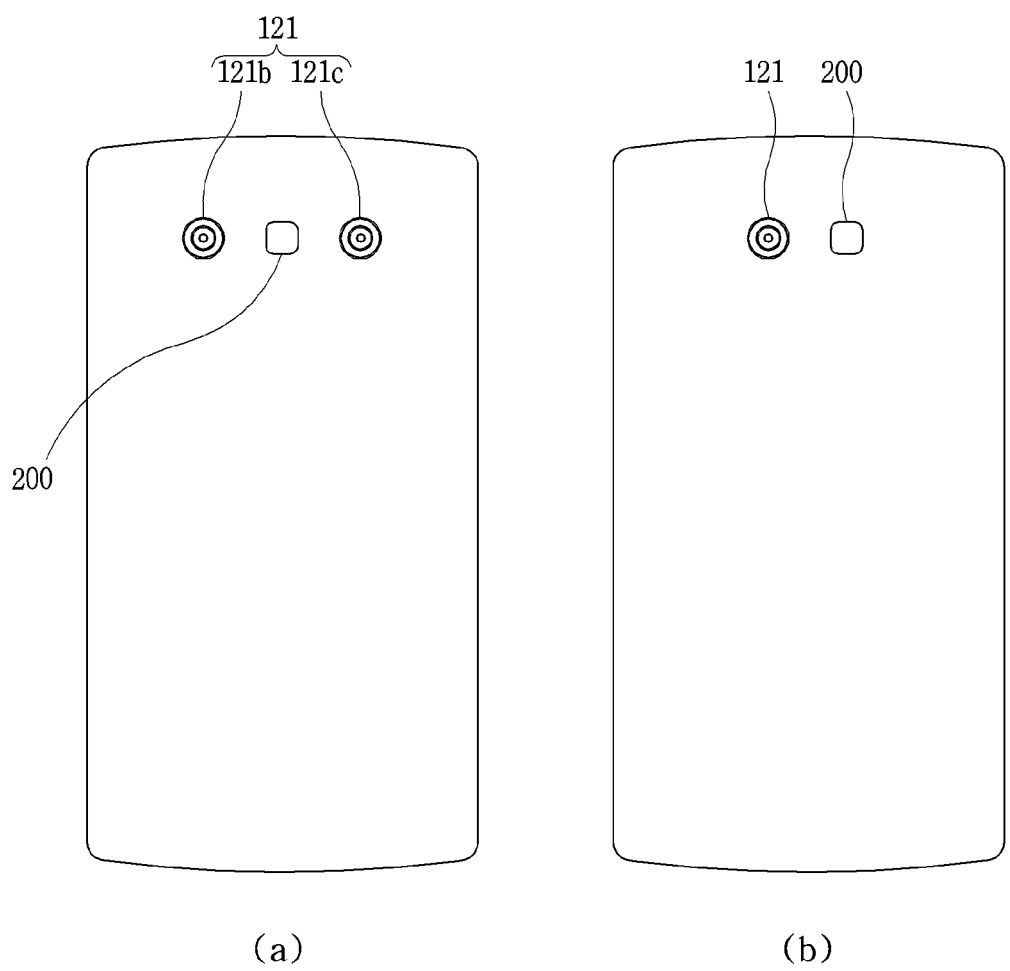
FIG. 2 is a conceptual view illustrating a camera and a lighting device provided in a mobile terminal related to the present disclosure.

FIG. 2 is a conceptual view illustrating a camera and a lighting device provided in a mobile terminal related to the present disclosure.

As illustrated in (a) of FIG. 2, the mobile terminal related to the present disclosure may have a plurality of cameras 121b and 121c on one surface thereof. Here, one surface of the mobile terminal 100 may be at least one of a rear surface, a front surface, and a side surface of the main body of the mobile terminal.

In (a) of FIG. 2, it is illustrated that the plurality of cameras 121b and 121c are provided on the rear surface of the main body of the mobile terminal.

Also, a lighting device 200 of the present disclosure may be provided on one surface on which, the plurality of cameras 121b and 121c are provided.

The lighting device 200 may include a plurality of light-emitting elements, and as described above, the lighting device 200 may irradiate light having a preset pattern to extract depth information of an image through the structured light scheme. Here, the plurality of light-emitting elements (or a plurality of light sources) may be, for example VCSEL.

As illustrated in (a) of FIG. 2, the mobile terminal of the present disclosure may extract depth information of an image received through the cameras by combining the stereo vision scheme and the structure light scheme using the plurality of cameras 121a and 121b and the lighting device 200 capable of irradiating light of a preset pattern.

However, without being limited thereto, although the plurality of cameras 121a and 121b are provided on one surface of the main body of the mobile terminal, the mobile terminal 100 of the present disclosure may extract depth information of an image received through the cameras using any one of the stereo vision scheme, the structure light scheme, and the ToF scheme or by combining at least two schemes.

However, without being limited thereto, as illustrated in (b) of FIG. 2, the mobile terminal 100 of the present disclosure may extract depth information of an image received through the camera using one camera 121 and the lighting device 200, using only the structure light scheme, using only the ToF scheme, or using a combination of the structure light scheme and the ToF scheme.

Meanwhile, the lighting device 200 provided in the mobile terminal 100 related to the present disclosure may irradiate light to form (or have) a predetermined pattern as described above in the structure light scheme. The lighting device 200 may include a plurality of light-emitting elements. Here, the light-emitting elements may be the aforementioned VCSEL.

The plurality of light-emitting elements may be formed to have a preset pattern or only some of the light-emitting elements may be turned on to irradiate light in a preset pattern.

The plurality of light-emitting elements (or a die including the plurality of light-emitting elements) may be referred to as a VCSEL array, for example.

The controller 180 of the mobile terminal related to the present disclosure may individually control each of the plurality of light-emitting elements (the plurality of light sources) included in the lighting device 200. In detail, the controller 180 may individually turn on or off the plurality of light-emitting elements provided in the lighting device 200. Also, the controller 180 may individually control emission intensity of the plurality of light-emitting elements provided in the lighting device (or lighting unit) 200. Also, the controller 180 may individually control (determine) an emission timing of the plurality of light-emitting elements provided in the lighting device 200.

The lighting device 200 may be individually turned on or off, varied in emission intensity, or changed in an emission timing under the control of the controller 180. Accordingly, a pattern (i.e., a preset pattern) of light irradiated from the lighting device 200 may be varied.

In this manner, in the lighting device 200 included in the mobile terminal of the present disclosure, a pattern (or intensity of light, a viewpoint of light) of irradiated light may be varied by individually controlling the plurality of light-emitting elements (the plurality of VCSELs), and in this point of view, the lighting device 200 may be referred to as active lighting.

Meanwhile, the lighting device 200 related to the present disclosure may irradiate light (or optical spot) of a preset pattern such that the light may be used for extracting depth information of an image. Here, the optical spot may refer to a region (or point) of a subject to which light is irradiated or a region (or a point) of the mobile terminal (or the lighting device 200, the camera, or the sensing unit) to which light reflected from a subject is irradiated.

Here, in the present disclosure, since the plurality of light-emitting elements included in the lighting device 200 are laser diodes (e.g., VCSELs), and thus, when the plurality of light-emitting elements emits light, light (laser) is irradiated on a narrow region (or point) of a subject. Accordingly, an optical spot may be formed in the subject. Also, in the present disclosure, on the basis of light (laser) reflected to be returned from the subject to the mobile terminal, an optical spot irradiated on the subject may be detected.

Meanwhile, the lighting device 200 may include a diffractive optical element (DOE). The DOE may be configured to diffract light (laser) output from the light-emitting elements.

The DOE may diffract light output from the light emitting element into a plurality of light beams. In this disclosure, diffracting light (laser) may be understood as splitting light, duplicating light, refracting a portion of light, and the like. In cases where one light output from the light-emitting element is diffracted (or split) into a plurality of light beams by the DOE, the sum of intensity of the plurality of light beams may be equal to intensity of the one light.

In other words, intensity of each of the plurality of light beams (i.e., any one of the plurality of light beams diffracted by the DOE) may be weaker than intensity of the one light beam before entering the DOE.

Meanwhile, the lighting device of the present disclosure may output a larger number of light beams (optical spots) than the number of the plurality of light-emitting elements using the DOE.

For example, in cases where the number of the plurality of light-emitting elements is n and the number of light beams (optical spots) output when one light beam passes through the DOE is m, the lighting device 200 of the present disclosure may output n*m number of light beams (optical spots) (or irradiate the n*m number of light beams to a subject).

In the present disclosure, the lighting device 200 may have a plurality of light-emitting elements and a DOE, and the DOE may diffract light output from the plurality of light-emitting elements such that a predetermined pattern is formed with respect to each of the plurality of light-emitting elements.

That is, the lighting device 200 of the present disclosure may include the DOE for diffracting light such that each of the light sources has the predetermined pattern. In other words, the DOE included in the lighting device 200 may diffract light such that one light beam output from one light-emitting element forms the predetermined pattern. Accordingly, a plurality of light beams output from the plurality of light-emitting elements may be diffracted to form the predetermined pattern and pass through the DOE.

Meanwhile, as described above, the mobile terminal according to one implementation of the present disclosure may not only extract depth information related to an image, but also extract or determine a material of a subject to be captured by the camera.

Hereinafter, description will be given in more detail of a lighting unit or illumination unit (lighting device) used for extracting or determining a material of a subject to be captured and a control method of a camera, with reference to the accompanying drawings.

Figure 3:
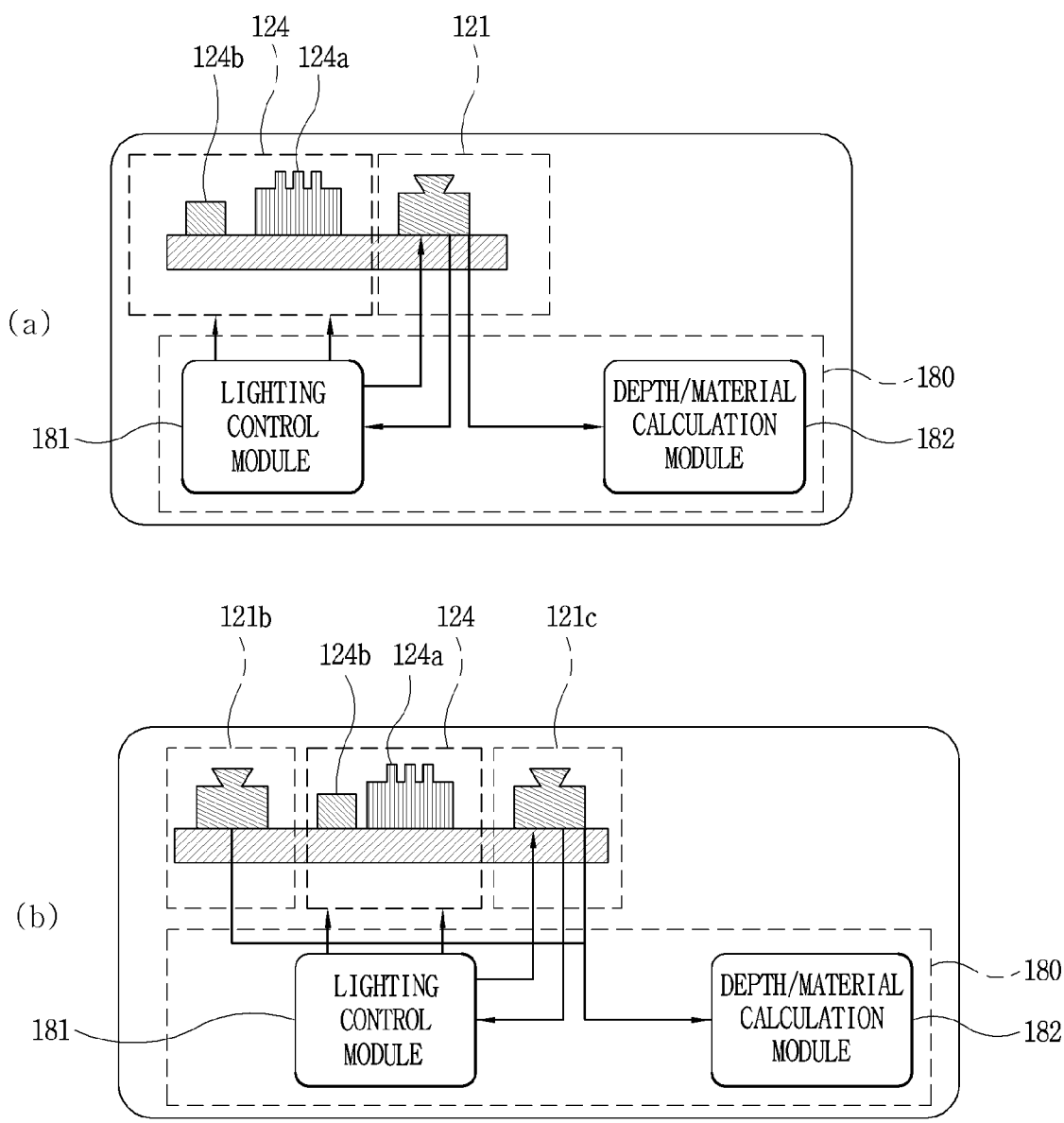
FIG. 3 is a conceptual view illustrating a configuration of a mobile terminal in accordance with one implementation of the present disclosure.

FIG. 3 is a conceptual view illustrating a configuration of a mobile terminal in accordance with one implementation of the present disclosure.

First, the mobile terminal of the present disclosure may include a lighting unit (or illumination unit) 124 (or the lighting device 200 described above), the camera 121, and a controller (or control unit) 180 that interacts with the camera 121 and the lighting unit 124 and controls them.

Specifically, the controller 180 may control the lighting unit 124 to irradiate illumination (or light) to a subject to be captured by the camera 121, and the camera 121 to capture the subject.

The controller 180 may determine a material of the subject based on information related to illumination (or light) irradiated to the subject to be captured through the camera.

Specifically, as illustrated in (a) of FIG. 3, the controller 180 may include a lighting control module 181 for controlling illumination, and a depth/material calculation module 182 for recognizing (calculating) at least one of depth information related to an image and a material of a subject included in the image, based on information related to illumination (or light) that is reflected from the subject to be received in the camera (or illumination information included in an image captured through the camera).

As illustrated in (a) and (b) of FIG. 3, the lighting control module 181 and the depth/material calculation module 182 may be configured as independent modules, or as software components included in the controller 180.

As illustrated in (b) of FIG. 3, the camera 121 disclosed herein, as illustrated in (a) of FIG. 2, may be configured as a plurality of cameras 121*b* and 121*c*.

Meanwhile, the lighting unit 124 may include a first light source 124*a* configured to irradiate pattern light (or structured light) and a second light source 124*b* configured to irradiate uniform light (or surface light).

The lighting unit 124 may include the first light source (pattern light source) 124*a* and the second light source (surface light source) 124*b*.

The first light source (pattern light source) 124*a* may be configured to irradiate light of a preset pattern.

The preset pattern refers to a light pattern in which light beams output from the pattern light source are irradiated onto a subject to be captured by positions at which a plurality of vertical cavity surface emitting lasers (VCSELs) is arranged, an optical duplication method of a diffractive optical element (DOE), or the like.

Specifically, the pattern light source may include a plurality of VCSELs (and diffraction optical elements (DOEs)) to emit a plurality of optical spots to a subject in a preset pattern.

As one example, the plurality of VCSELs may be provided on a die in an arrangement corresponding to a preset pattern so that a plurality of optical spots is irradiated to a subject in the preset pattern when the lighting device is not equipped with a DOE.

Meanwhile, the second light source (surface light source) 124*b* may be configured to irradiate uniform light.

For example, the second light source (surface light source) 124*b* may uniformly irradiate light to an area (space) to which light is output.

For example, the same quantity of light beams may be irradiated to a first area to which light output from the second light source (surface light source) 124*b* is irradiated and a second area different from the first area, and intensity of light (or brightness of light) irradiated to each area may be the same.

As illustrated in FIG. 3, the lighting unit 124 of the present disclosure may include the pattern light source 124*a* and the surface light source 124*b*.

Here, the pattern light source 124*a* and the surface light source 124*b* may output infrared rays. For example, the wavelength of infrared rays irradiated from the pattern light source 124*a* and the surface light source 124*b* may be 940 nm.

Meanwhile, the camera 121 of the present disclosure may include a high-resolution sensor. The high-resolution sensor may be, for example, an infrared sensor.

When the high-resolution sensor is an infrared sensor, the camera 121 of the present disclosure may be referred to as an infrared camera (or IR camera).

The high-resolution sensor 900 may be configured to sense only light output from the lighting unit 124 (or the wavelength of illumination light irradiated from the lighting unit 124).

For example, when the wavelength of infrared rays output from the pattern light source 124a and the surface light source 124b is 940 nm, the high-resolution sensor may receive only light having a wavelength of 940 nm.

Meanwhile, the controller 180 of the present disclosure may include a lighting control module 181 that controls the lighting unit 124 and a depth/material calculation module 182 that controls the high-resolution sensor (or camera 121).

That is, the operations/functions/controls performed by the lighting control module 181 and the depth/material calculation module 182 may be understood as being performed by the controller 180.

On the other hand, the pattern light source 124a, the surface light source 124b, and the lighting control module 181 may be electrically connected to or disconnected from the mobile terminal, and may be understood to be included in a physically-detachable lighting device (or lighting module).

In addition, the high-resolution sensor 121 and the depth/material calculation module 182 may be electrically connected to or disconnected from the mobile terminal, and may be understood to be included in a physically-detachable camera (or camera module).

Figure 4:
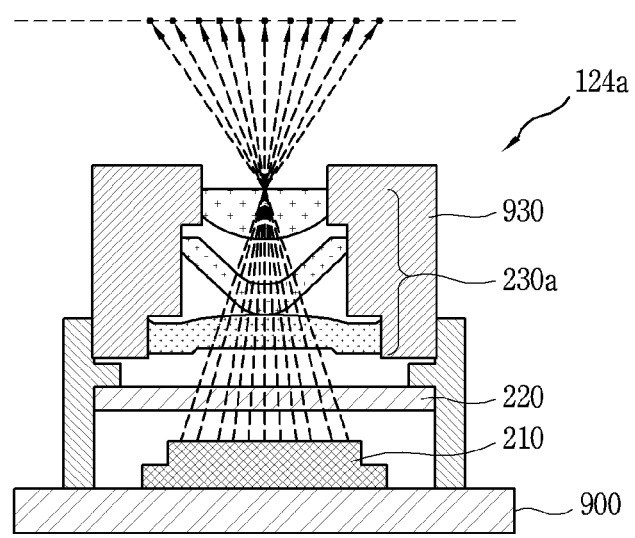
FIG. 4 is a conceptual view illustrating a pattern light source in accordance with one implementation of the present disclosure.

FIG. 4 is a conceptual view illustrating a pattern light source in accordance with one implementation of the present disclosure.

Referring to FIG. 4, the first light source (pattern lighting (pattern illumination)) 124a of the lighting unit 124 according to the one implementation of the present disclosure may include a printed circuit board 900.

The printed circuit board 900 may include a printed circuit board (PCB) or a printed wiring board (PWB).

The printed circuit board 900 may be provided with a circuit printed (placed, mounted) thereon and capable of transmitting an electric signal. At least one of the components illustrated in FIG. 1 may be disposed on the printed circuit board 900, and the components may be configured to transmit and receive electrical signals.

The first light source 124a may include a submount (not shown) mounted (arranged, coupled) on the printed circuit board 900.

In addition, the first light source 124a related to the present disclosure may include a die 210 mounted on the submount and having a plurality of light-emitting elements.

The submount may perform a heat dissipating function. Specifically, the submount may be configured to dissipate heat generated by the die 210 disposed on the submount (specifically, heat generated due to light emission of the plurality of light-emitting elements provided on the die 210). For example, the submount may be made of a heat-dissipating material and may be named as a heatsink.

The die 210 may be provided with a plurality of light-emitting elements. For example, each of the plurality of light-emitting elements may be a laser diode or a VCSEL.

The first light source 124a according to the present disclosure may include a pad that is inserted into a hole formed in the submount, connected to the die 210 in a wire bonding manner, and electrically connected to the printed circuit board 900, so that the die 210 and the printed circuit board 900 are electrically connected through the submount.

That is, referring to FIG. 4, the first light source 124a according to the present disclosure may include the printed circuit board 900, the submount mounted on the printed circuit board 900, the die 210 mounted on the submount and having the plurality of light-emitting elements, and the pad inserted into the hole formed in the submount, connected to the die 210 in the wire bonding manner, and electrically connected to the printed circuit board 900, so that the die 210 and the printed circuit board 900 are electrically connected through the submount.

The wire bonding, the hole and the pad may be provided in plurality in number. For example, the number of the hole and the pad may correspond to the number of the wire bonding on the die 210.

The submount may be provided with a plurality of holes. The holes formed in the submount may be formed through the submount. In one example, the holes may include via holes.

In each of the holes, the pad may be inserted (placed, arranged). The pad may be made of a conductive material. The pad may be referred to as a bonding pad.

The pad may be inserted into the hole formed through the submount so as to be connected to the die 210 by the wire bonding.

The pad may be inserted through the hole of the submount to be electrically connected to the printed circuit board 900.

The pads inserted through the holes formed through the submount may allow the die 210 and the printed circuit board 900 to be electrically connected to each other through the submount.

Specifically, the plurality of light-emitting elements provided on the die 210 and (a circuit provided on) the printed circuit board 900 may be electrically connected through the submount owing to the pads inserted through the submount.

Also, an area of the submount may be larger than an area of the die 210. This is for the wire bonding between the die 210 and the pads inserted through the holes formed through the submount.

On the other hand, the first light source 124a according to the present disclosure, as illustrated in FIG. 4, may include a holder 930 provided on the printed circuit board 900 to surround (cover, include, accommodate) the die 210 and the submount.

The holder 930 may be formed to have an inner space between the die 210 and the holder 930. The inner space may preferably be in a vacuum state without air, but may not be in the vacuum state.

The holder 930 may be formed to surround (cover, include, accommodate) the die 210, the submount, the pads inserted through the holes formed through the submount, and the wire bonding connecting the die 210 and the pads.

The holder 930 may serve as a case in that the holder 930 surrounds the die 210, the submount, the wire bonding, the pad, and the like. Further, the holder 930 may be configured as a single case or a combination of a plurality of cases.

Meanwhile, an inner space may be formed between the holder 930 and the die 210.

The first light source 124a of the present disclosure may include a diffractive optical element (DOE) 220 disposed in the inner space between the holder 930 and the die 210 and mounted (arranged) by the holder 930. The DOE 220 may be positioned in an optical axis direction of the plurality of light-emitting elements so that light output from the plurality of light-emitting elements of the die 210 can pass therethrough.

The DOE 220 may or may not be provided selectively depending on the user's design.

In addition, the first light source 124*a* of the present disclosure may diffract or split light emitted from light-emitting elements into a plurality of light beams using a refractive optical element (e.g., at least one of a grating cell array (GCA), a mirror/prism array, a micro lens array, a fly eye lens and a birefringence element, or a combination of two of them), in replacement of the diffractive optical element.

Descriptions of the DOE hereinafter may also be inferred and applied to a case of using the refractive optical element or to case of combining the DOE and the refractive optical element in the same/similar manner.

The holder 930 of the first light source 124*a* of the present disclosure may be provided with a lens 230 through which light output from the plurality of light-emitting elements provided on the die 210 is transmitted. That is, the lens 230*a* may be mounted (placed) in the holder 930 and located in an optical axial direction of the plurality of light-emitting elements, such that light emitted from the plurality of light-emitting elements (or light passed through the DOE 220) can be transmitted therethrough.

The light output from the plurality of light-emitting elements provided on the die 210 may be diffracted (split or duplicated) by the DOE 220, and the diffracted (split or duplicated) light may then be incident on the lens 230 and transmitted through the lens 230 to be output to an external space.

The holder 930 may be provided with the lens 230 through which light output from the plurality of light-emitting elements provided on the die 210 is transmitted. The lens 230 may include at least one of the microlens array, the reflective lens, the collimator lens, the grating cell array (GCA), the mirror/prism array, the fly eye lens, the birefringence element, etc.

The lens 230 may allow light output from the plurality of light-emitting elements 210*a*, 210*b*, 210*c*, and 210*d* or light that has passed through the DOE 220 to be transmitted therethrough.

The lens 230 provided in the lighting device 200 of the present disclosure may be a general lens 230*a* or a telecentric lens.

Figure 5:
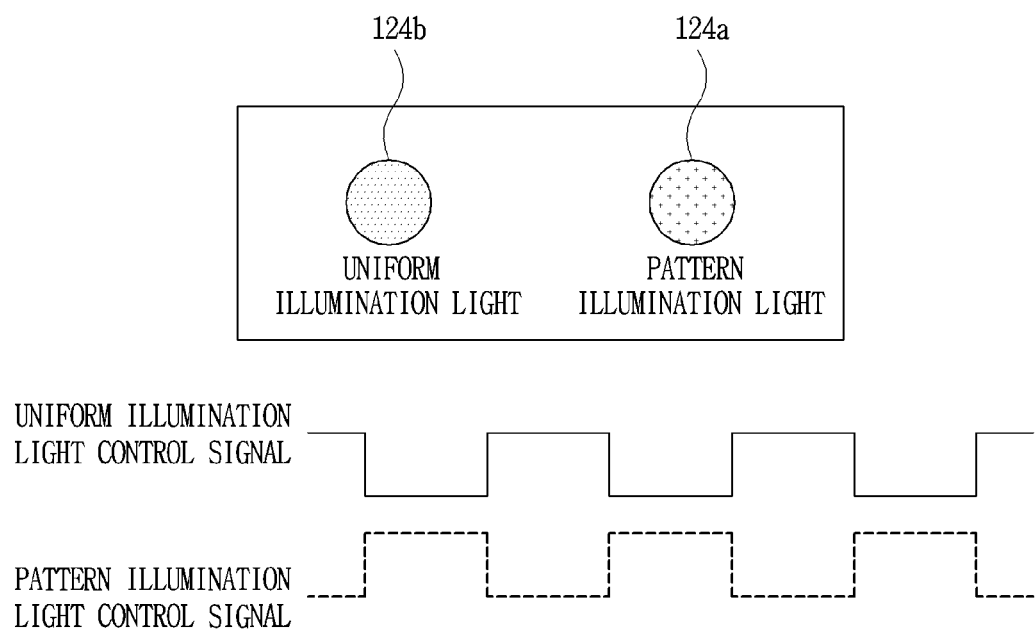
FIG. 5 is a conceptual view illustrating a control method of a lighting unit according to the present disclosure.

FIG. 5 is a conceptual view illustrating a control method of a lighting unit according to the present disclosure.

The controller 180 may capture a 3D image using the lighting unit 124 and the camera 121.

Here, capturing a 3D image should be understood as a concept including extracting depth information, extracting edge information, and extracting brightness information.

In addition, the controller 180 may extract/decide/determine a material of a subject to be captured using the lighting unit 124 and the camera 121.

The controller 180 (or the lighting control module 181) may independently control the pattern light source 124*a* and the surface light source 124*b*.

In addition, the controller 180 may control the pattern light source 200*a* and the surface light source 200*b* in a preset manner in order to extract high-resolution depth information or a material of a subject using one camera (e.g., infrared camera).

For example, the controller 180 may turn on the first light source (pattern light source 124*a*) and the second light source (surface light source 124*b*) alternately.

As illustrated in FIG. 5, the controller 180 may turn off the second light source (uniform illumination light, surface illumination) 124*b* when the first light source (pattern illumination light) 124*a* is turned on for a first (period of) time, and turn off the first light source 124*a* when the second light source 124*b* is turned on for a second (period of) time after the first period of time.

The controller 180 may control the lighting unit 124 such that the pattern light irradiated from the pattern light source 124*a* and the surface light irradiated from the surface light source 124*b* can be output alternately for each frame in which the camera 121 (or high-resolution sensor 900) receives (acquires) an image.

For example, the controller 180 may control the surface light source 124*b* not to emit light while the pattern light source 124*a* emits light, and control the pattern light source 124*a* not to emit light while the surface light source 124*b* emits light.

For example, the controller 180 may control the lighting unit 124 such that the first light source 124*a* emits light when the camera 121 captures a first frame and the second light source 124*b* emits light when the camera 121 captures a second frame after capturing the first frame.

In detail, while capturing the first frame, the pattern light source 124*a* may emit light (On) and the surface light source 124*b* may not emit light (Off). On the other hand, while capturing the second frame, the surface light source 124*b* may emit light and the pattern light source 124*a* may not emit light.

Subsequently, the controller 180 may control the pattern light source 124*a* to emit light again when the camera 121 captures a third frame after capturing the second frame, and control the surface light source 124*b* to emit light when the camera 121 captures a fourth frame after capturing the third frame.

Similarly, the controller 180 may control the surface light source 124*b* not to emit light while capturing the third frame, and control the pattern light source 124*a* not to emit light while capturing the fourth frame.

On the other hand, the controller 180 may control the pattern light source 124*a* to emit light for at least part of a (period of) time during which the first frame (third frame) is captured, and control the surface light source 124*b* to emit light for at least part of a time during which the second frame (or fourth frame) is captured.

For example, the controller 180 may control the lighting unit 124 such that the pattern light source 124*a* or the surface light source 124*b* emits light for all the time during which one frame is captured or any of the pattern light source 124*a* and the surface light source 124*b* does not emit light for a predetermined (period of) time. The at least part of the time may refer to a time obtained by subtracting the predetermined time from a total time during which one frame is captured.

The reason why both the pattern light source 200*a* and the surface light source 200*b* do not emit light for the predetermined time during the time for capturing one frame is to synchronize a time for which an aperture of the camera is open with a time for which a lighting is turned on, and to prevent interference between light beams emitted from the surface light source and the pattern light source.

Thereafter, the controller 180 may determine/extract/decide a material of a subject included in an image using a preset algorithm, on the basis of a difference between images that are acquired through the camera 121 while alternately turning on and off the first light source (pattern light source) and the second light source (surface light source).

As described above, the mobile terminal of the present disclosure may extract depth information related to an image captured through the camera using structured light and a surface light source.

In addition, the present disclosure may provide a mobile terminal including a lighting unit that is configured to distinguish (determine, identify) a material of an object (i.e., a subject to be captured by a camera), and the camera.

To this end, the present disclosure may determine/extract/decide a material of a subject in consideration of power, wavelength, beam profile (light distribution), etc. of illumination (i.e., light or auxiliary light) irradiated from the lighting unit, and accordingly determine whether the subject is a real object or a fake object (e.g., whether the subject is a printed picture or not).

There are several factors for recognizing an object. Color, size, material (or texture), and shape may correspond to such factors.

In addition, the mobile terminal of the present disclosure intends to further provide a function to determine a material in addition to functions of the existing camera.

To this end, the present disclosure may divide auxiliary light into a plurality of segments (or groups, or units) so that the lighting unit emits illumination light of different wavelengths for each (period of) time.

The sensor (camera) may sequentially acquire reactions of an object with respect to light beams with wavelengths 1, 2, 3, and 4.

Since a material of an object (subject) responds to wavelengths of light beams, the material may be identified from the responses to several representative wavelengths.

In addition, the mobile terminal of the present disclosure may determine a material of an object from a response to power of auxiliary light at a specific wavelength by irradiating illumination light (the auxiliary light) of the specific wavelength from the lighting unit.

That is, the mobile terminal of the present disclosure employs a method of recognizing (determining) a material by emitting auxiliary light of different power for each (period of) time and checking a response to the auxiliary light.

In another method, the mobile terminal of the present disclosure may recognize (determine) a material (or texture) of a subject by sequentially using different auxiliary light beams (i.e., uniform illumination light and pattern illumination light).

The mobile terminal of the present disclosure may obtain texture from a response (reaction) of an object to (with) uniform light such as an LED, obtain beam profile (optical profile) from pattern illumination light, and combine the obtained texture and beam profile, thereby determining (extracting, identifying) a material of the object.

The mobile terminal of the present disclosure may also determine a material of an object using deep learning and artificial intelligence (AI) from a separate RGB camera.

The mobile terminal of the present disclosure may improve accuracy of determining a material of an object by combining at least two of the aforementioned methods.

A mobile terminal including a depth camera (the lighting unit and the camera) to which the technology of the present disclosure is applied may determine (extract or decide) a material of a subject while exhibiting superior depth performance (depth information recognition performance) to the existing camera. Accordingly, the mobile terminal of the present disclosure can increase reliability of finance, security, and object recognition that have recently emerged.

Referring back to FIG. 3, the mobile terminal including the depth camera capable of determining (extracting or identifying) a material according to the present disclosure may include the camera unit 121, the lighting unit (illumination unit) 124 (or an auxiliary light unit), and a lighting control module 181 (or a control unit), and a depth/material calculation module 182 (or a calculation unit).

The lighting unit 124 (or the auxiliary light unit) may include the uniform auxiliary light source (or the second light source) and the pattern auxiliary light source (or the first light source). Alternatively, the uniform auxiliary light source may not be included.

The uniform auxiliary light source is a lighting (illumination) that emits uniform light, and may be configured as an LED, LED+DOE, VCSEL (LD)+DOE, or the like.

The pattern auxiliary light may be configured as VCSEL, an illumination lens, and/or DOE (option).

A method of implementing the auxiliary light will be described later in more detail with reference to the accompanying drawings.

The camera unit (or camera 121) may include sensors, which may be configured as sensors, and each sensor may include an image sensor, a filter, and a lens. The camera unit may use one to four sensors.

For example, the sensor of the camera unit may be configured by simultaneously using a general monochromatic sensor for short wavelength and an RGB sensor, or only one of a sensor for short wavelength or an RGBIR sensor.

The sensor may be configured as a general sensor, a high-speed sensor with a high frame rate, an event sensor, or the like.

The auxiliary light source (first light source) may be provided with plural segments.

In the case of a general sensor with a low frame rate, the frame rate may be delayed in obtaining information by projecting a pattern over an entire area.

Therefore, the camera of the mobile terminal of the present disclosure may be provided with a high-speed sensor having a frame rate of several hundreds of fps (frame per second), which is higher than a frame rate of several tens of fps equipped in a general sensor, or a high-speed type event sensor that recognizes information per pixel.

Meanwhile, in the case of a general sensor, a global shutter sensor may be provided rather than a rolling shutter sensor. Through this, the present disclosure can be used not only for applications of depth cameras, but also for applications of general 2D cameras and IR cameras.

In addition, since depth information as well as material information can be obtained in view of the use of pattern auxiliary light, the present invention can be advantageous in application of a depth camera.

Also, the sensor may generally be configured as a short wavelength-monochromatic-sensor.

An optical filter of the sensor may be located between the sensor and the lens. An optical filter suitable for wavelengths of uniform illumination light and pattern auxiliary light may be used.

For example, if uniform auxiliary light uses a wavelength of 940 nm and pattern auxiliary light uses a wavelength ranging from 430 to 650 nm, the optical filter of the sensor may be configured as a broadband wavelength transmission bandpass filter covering the entire wavelengths of 430 to 940 nm.

The control unit (controller 180) may perform lighting control, camera control, and lighting-camera control.

The lighting (illumination) control may be performed to control respective segments of an auxiliary light source having plural segments to be sequentially turned on/off.

When using an LED, the control unit (controller 180) may control the LED uniform auxiliary light and the pattern auxiliary light to be sequentially turned on/off, and control the sensor to receive such light. The LED light which is a uniform surface light source may be used for obtaining shape, features, and 2D raw images of an object. On the other hand, the pattern auxiliary light which is a beam profile (light distribution) of pattern and optical spots may be used for obtaining depth information.

Both the uniform auxiliary light and the pattern auxiliary light may be used for obtaining material information.

The lighting-camera control may be carried out to synchronize a sensor exposure time with an On/Off time of an illumination.

The camera control may be carried out to control automatic exposure of AE or the like, and to control synchronization between two sensors in the case of a stereo camera.

A signal obtained from the sensor may be used by the calculation unit (depth/material calculation module 182) to acquire a material and 3D depth image based on at least one of pattern shift, size, intensity and distribution of optical spots (pattern), and features (feature point) of a 2D raw image.

An image synthesis from RGB images may also be performed by using a separately provided RGB camera or by using an RGBIR sensor.

Referring to FIG. 4, a pattern auxiliary light (first light source) determining or extracting a material according to the present disclosure may include a VCSEL, a DOE, and a lens.

A uniform auxiliary light (second light source) may be configured as LED (or VCSEL)-diffuser.

The first light source illustrated in FIG. 4 may include VCSEL (LED or LD)-lens, VCSEL (LED or LD)-diffractive element (the diffractive element is a diffuser, a DOE, a microlens array, grating, HOE, etc.), VCSEL (LED or LD)-lens-diffractive element, and VCSEL (LED or LD)-diffractive element-lens (the lens is a refractive lens and reflective mirror/prism/di-choic mirror, etc.).

The auxiliary light used to determine a material of a subject may be configured as a uniform auxiliary light (LED or LD) or/and a pattern auxiliary light (VCSEL or LD). The auxiliary light may be used in plurality. The auxiliary light may include an AF or/and aperture, and an OIS actuator.

The VCSEL may create a basic pattern and create optical spots.

The VCSEL may project a pattern on an object by creating an angle of view of the lens.

The diffractive element may increase the number of patterns of a light pattern by duplicating a basic pattern of the VCSEL.

The controller 180 may determine a material of a subject in consideration of the following items. For example, the controller 180 may determine a material of a subject based on reflectance.

In order to determine a material based on the reflectance, it is necessary to know reflectance at a reference distance. Information regarding the reflectance at the reference distance may be previously stored in a memory.

Reflectance (response signal of sensor) may be decided by the following factors.

Illumination light parameters such as wavelength, power intensity, frequency, etc. of illumination light
Measurement conditions: distance, angle, ambient light
Measurement object: material (or texture), color, shape
Active illumination is more advantageous than a passive method without using an illumination. (It is necessary to know quantity and wavelength of illumination (light))
The change in reflectance according to an angle should also be considered.

In the case of a face, reflectance of a skin is different from reflectance of pupils.

For example, it is necessary to consider data based on characteristics of a specific object-human skin, pupils, hair, and race.

On the other hand, it is not easy to determine a material of an object in various environments. However, in the present disclosure, materials may be determined by relatively different responses to wavelengths of light beams.

Examples of material classification according to reflectance are as follows.

0-25%: black series
26-50%: stone, tile
51-75%: cotton, skin
76-100%: glass, white series
*Applying the examples of the material classification according to the reflectance to a vehicle, the following results may be obtained.
0-40%: seat belt
40-50%: face, skin
50-70%: cotton, seat cover
60-80%: seat cover Hereinafter, a method of controlling a pattern lighting (illumination) (first lighting) for determining a material of a subject will be described in more detail.

FIGS. 6, 7, 8, 9, 10, 11, 12, 13A, 13B, 14, 15, 16, 17, 18, 19, 20, and 21 are conceptual views illustrating a method of controlling a lighting (illumination) that is used by a mobile terminal for determining (recognizing) a material of a subject to be captured.

Figure 6:
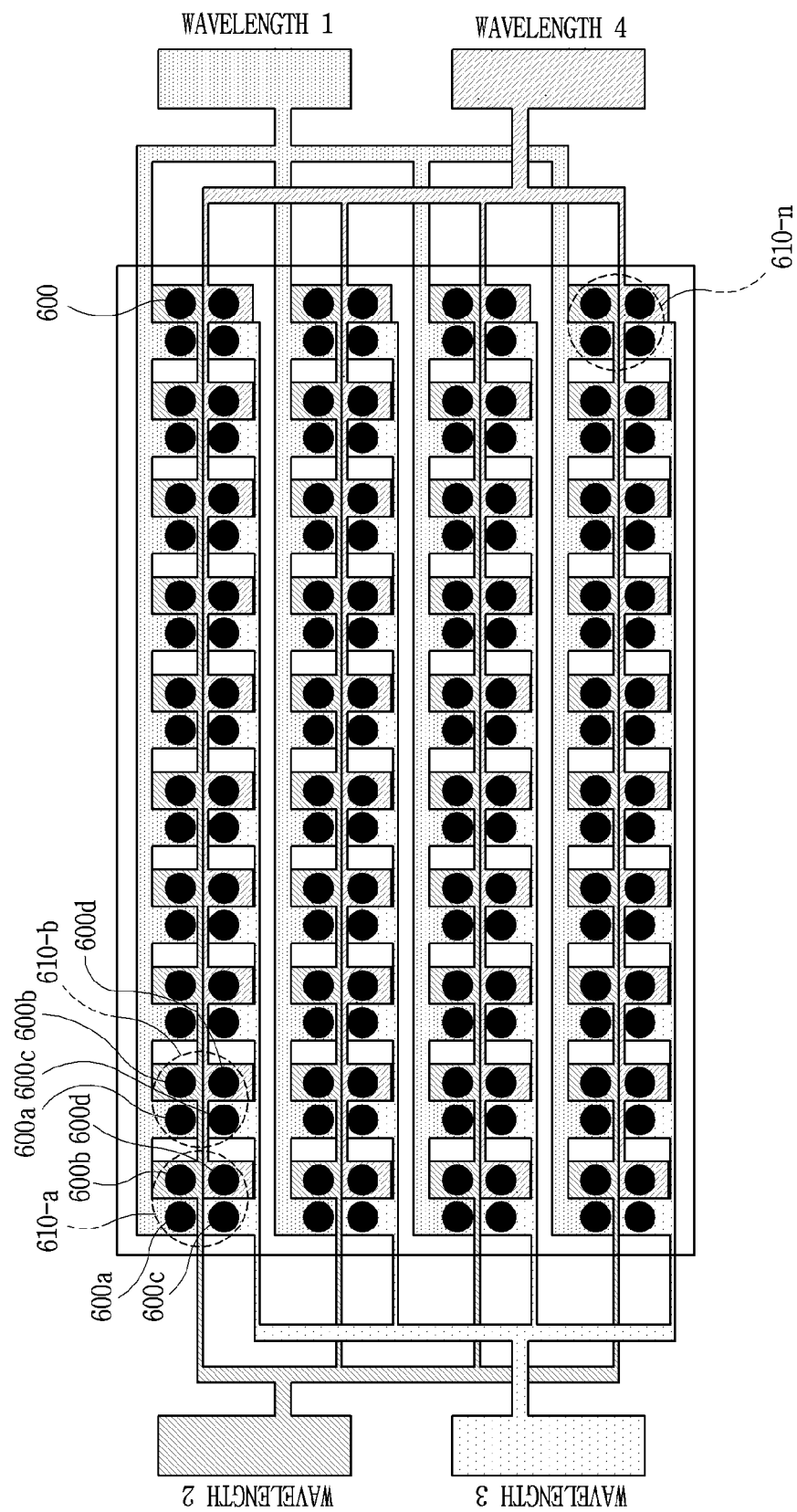

Referring to FIG. 6, the light source 124*a* may include a plurality of light-emitting elements 600*a*, 600*b*, 600*c*, and 600*d*, 600.

The plurality of light-emitting elements 600 may be grouped into a plurality of groups 610-*a*, 610-*b*, ..., 610-*n*.

The groups may refer to the aforementioned segments.

Each group may include the same number of light-emitting elements 600*a*, 600*b*, 600*c*, 600*d*, four).

The controller 180 may control the light-emitting elements included in the plurality of groups 610-*a*, 610-*b*, ..., 610-*n* in a preset manner.

For example, as illustrated in FIG. 6, the controller (control unit) 180 may control the lighting unit 124 such that a first light-emitting element 600*a* (e.g., a light-emitting element located at a position 1×1) and a second light-emitting element 600*b* (e.g., a light-emitting element located at a position 1×2), which are included in each of the plurality of groups 610-*a*, 610-*b*, ..., 610-*n*, output light beams of different wavelengths.

For example, the controller 180 may control the lighting unit 124 such that the first light-emitting element 600*a*, the second light-emitting element 600*b*, the third light-emitting element 600*c*, and the fourth light-emitting element 600*d* which belong to each group irradiate illumination light of a first wavelength, a second wavelength, a third wavelength, and a fourth wavelength, respectively.

Referring to FIG. 6, the controller 180 may group light-emitting elements for determining (extracting) a material into n segments (groups), and may control the respective n segments to project light sequentially with a time difference.

At this time, each segment (group) may project light of a different wavelength.

The controller 180 may determine a material of a subject by using the fact that each material exhibits different reflectance for wavelength.

The controller 180 may determine a material according to a response for each area/material by controlling the segments 1 to 4 to project (irradiate, emit) light to a specific object/material (subject) in a sequential manner.

The controller 180 may also determine a material by checking a response of only one of the segments 1 to 4 or multiple responses of the segments 1 to 4.

In addition, the controller 180 may determine a material of an object, which exhibits a similar reflection/scattering response but is made of different materials, using AI algorithm/data based on RGB or IR raw images.

In the mobile terminal of the present disclosure, the number of segments (groups) and the number of power adjustment steps may be set randomly.

The plurality of light-emitting elements may be arranged in a random pattern as well as a regular pattern as illustrated in FIG. 6.

Each segment (group) may have an arbitrary shape other than a rectangular shape.

The segments (groups) may have areas that are independent of one another or intersect with one another.

Each of the examples described herein may be used independently and also some of the examples may be used in combination.

In FIG. 6, only a VCSEL structure has been described, but a DOE and a lens may be placed on the VCSEL to construct an auxiliary lighting together.

Figure 7:
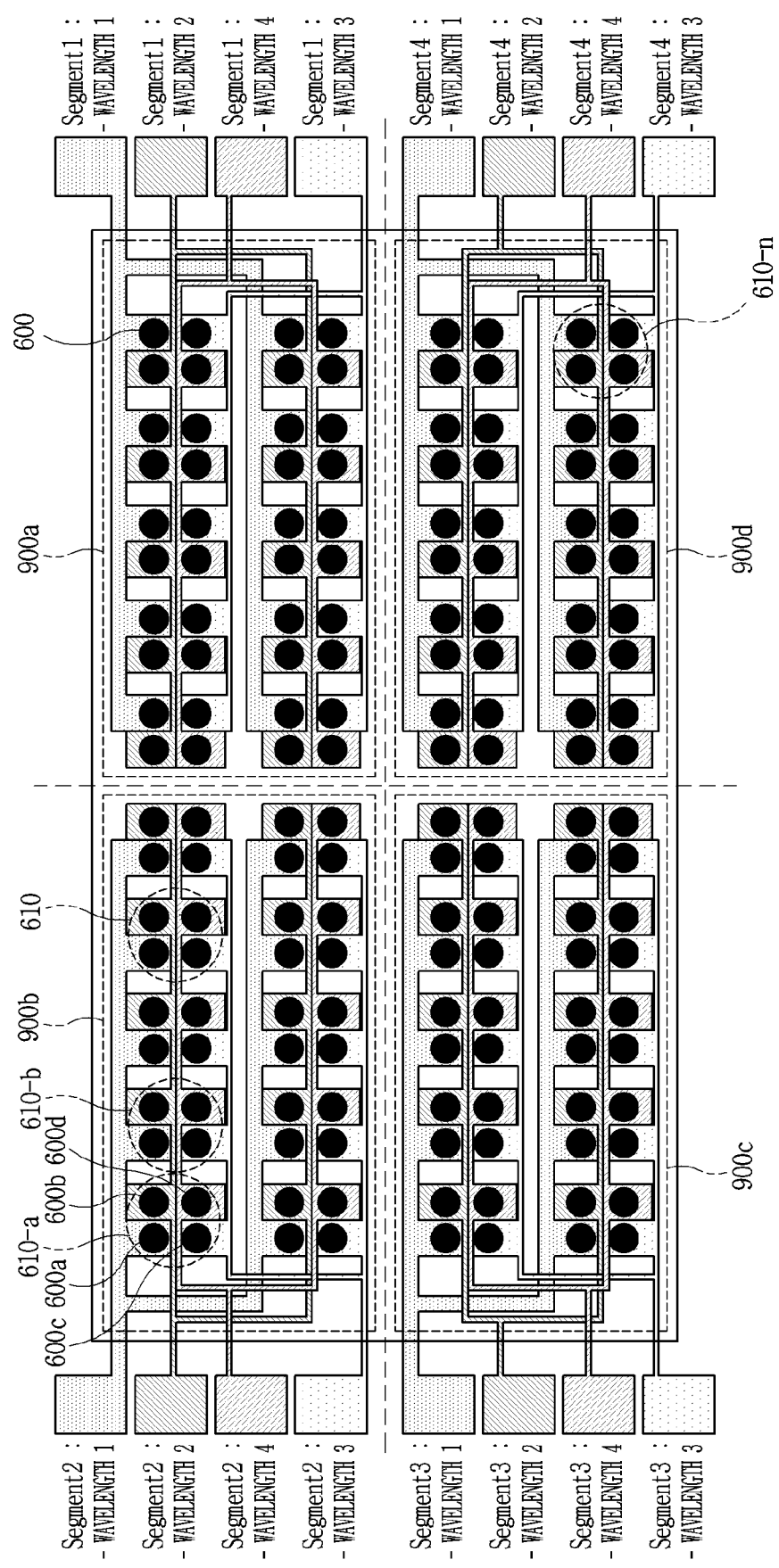

As illustrated in FIG. 7, the controller 180 may group a plurality of groups 610-*a*, 610-*b*, . . . , 610-*n* into a plurality of units 900*a*, 900*b*, 900*c*, and 900*d*. Here, the unit may refer to the aforementioned segment or a medium group (or a large group) in which those groups are grouped again.

The controller 180 may control the lighting unit 124 to emit light without a time overlap for each unit.

The plurality of units 900*a*, 900*b*, 900*c*, and 900*d* may include the same number of groups.

The controller 180 may control the lighting unit 124 such that one (e.g., 900*a*) of the plurality of units is turned on and simultaneously light-emitting elements included in the other units 900*b*, 900*c*, and 900*d* do not emit light.

That is, the controller 180 may control the lighting unit such that the plurality of units irradiates light with time differences, rather than controlling the entire light-emitting elements.

In the case of controlling the first unit 900*a* among the plurality of units, as illustrated in FIG. 7, the controller 180 may control the lighting unit such that the first light-emitting element and the second light-emitting element included in each of the plurality of groups included in the first unit 900*a* output light beams of different wavelengths.

Further, while the first light-emitting elements emit light, the second to fourth light-emitting elements may not emit light, and thereafter, the second light-emitting element, the third light-emitting element, and the fourth light-emitting element may sequentially emit light.

As another example, in the case of FIG. 6, wavelengths 1 to 4 may be turned on/off alternately for an entire area without a segment. On the other hand, in the case of FIG. 7, the groups each outputting the wavelengths 1 to 4 may be grouped into the units (segments) 1 to 4 which may then be turned on/off alternately for each wavelength.

Accordingly, the controller 180 may control those segments such that the units (segments) 1 to 4 for the wavelength 1 are sequentially turned on, the units 1 to 4 for the second wavelength 2 are sequentially turned on, the units 1 to 4 for the third wavelength 3 are sequentially turned on, and then the units 1 to 4 for the fourth wavelength 4 are sequentially turned on.

Since the entire area is divided into the segments (units), a lighting control can be performed for each area/wavelength and a material of a specific area can be determined (extracted, detected, recognized).

Figure 8:
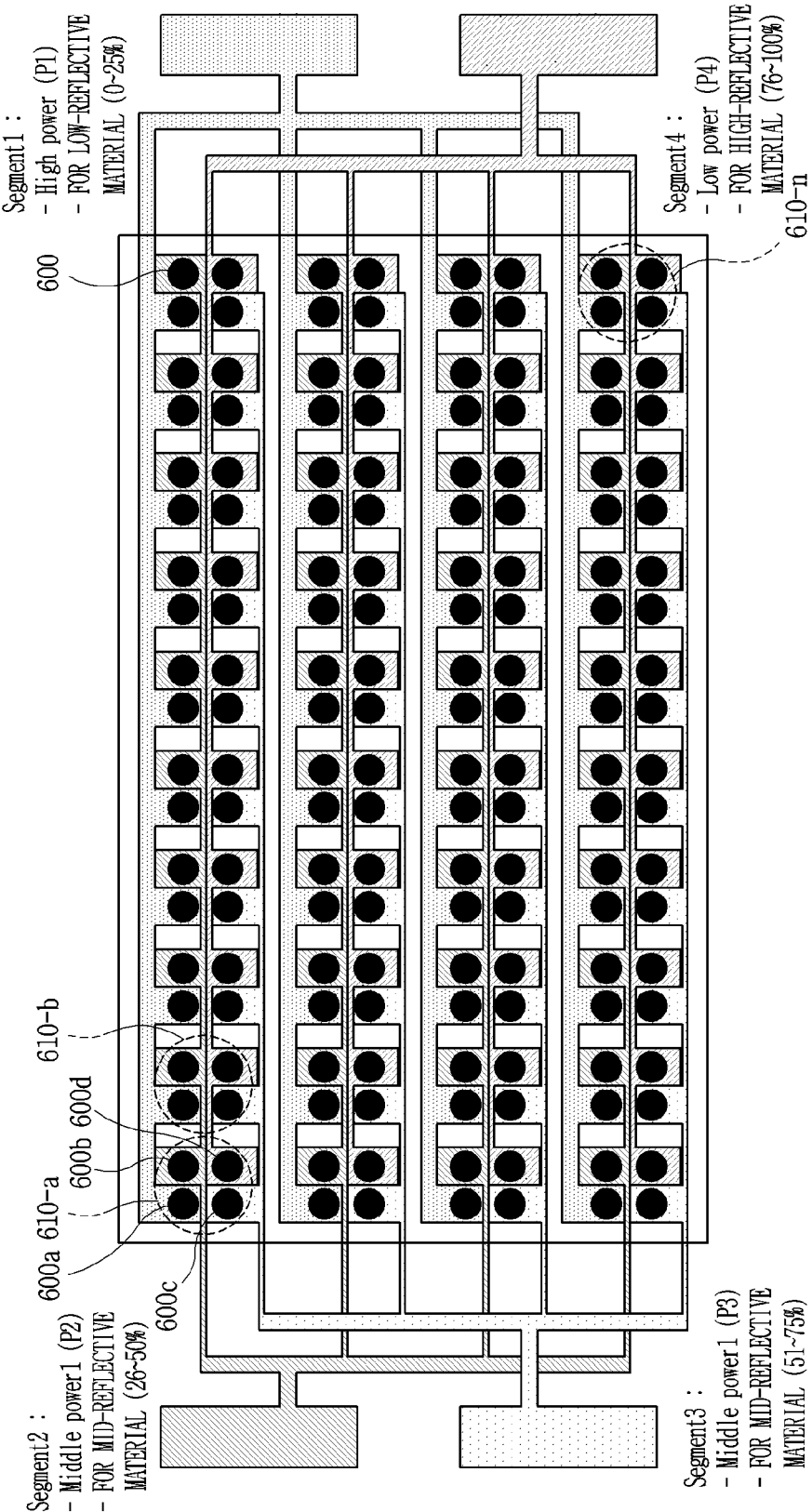

As illustrated in FIG. 8, the controller 180 may control the lighting unit such that the first light-emitting elements 600*a* and the second light-emitting elements 600*b* included in the plurality of groups 610-*a*, 610-*b*, . . . , 610-*n*, respectively, emit light of different power.

For example, the control unit 180 may control the lighting unit such that the first light-emitting elements 600*a* included in the plurality of groups, respectively, output light of first power for a low-reflective material, the second light-emitting elements 600*b* output light of second power for a mid-reflective material (26 to 50%), the third light-emitting elements 600*c* output light of third power of another mid-reflective material (51 to 70%), and the fourth light-emitting elements 600*d* output light of fourth power for a high-reflective material (76 to 100%).

In this case, the controller 180 may control the first to fourth light-emitting elements to emit light sequentially, in a manner that the first to fourth light-emitting elements output light without a time overlap.

In addition, the controller 180 may control the camera to capture a first frame while the first light-emitting elements output light, and a second frame while the second light-emitting elements output light, and a third frame while the third light-emitting elements output light, and a fourth frame while the fourth light-emitting elements output light.

That is, the controller 180 may determine a material of a subject by controlling groups each having different light power intensity.

The controller 180 may determine a material of a subject by using a difference in reflection/scattering for each material.

The controller 180 may determine a material according to a response for each area/material by controlling the first to fourth light-emitting elements to project (irradiate, emit) light to a specific object/material in a sequential manner.

The controller 180 may determine a material by checking a response of only one of the first light-emitting element of each of the first to fourth light-emitting elements, or multiple responses of the first to fourth light-emitting elements.

FIG. 8 illustrates an example in which the first to fourth light-emitting elements emit light in a dividing manner to an entire area based on power.

The number of light-emitting elements included in each group and the number of power adjustment steps may be randomly set.

Figure 9:
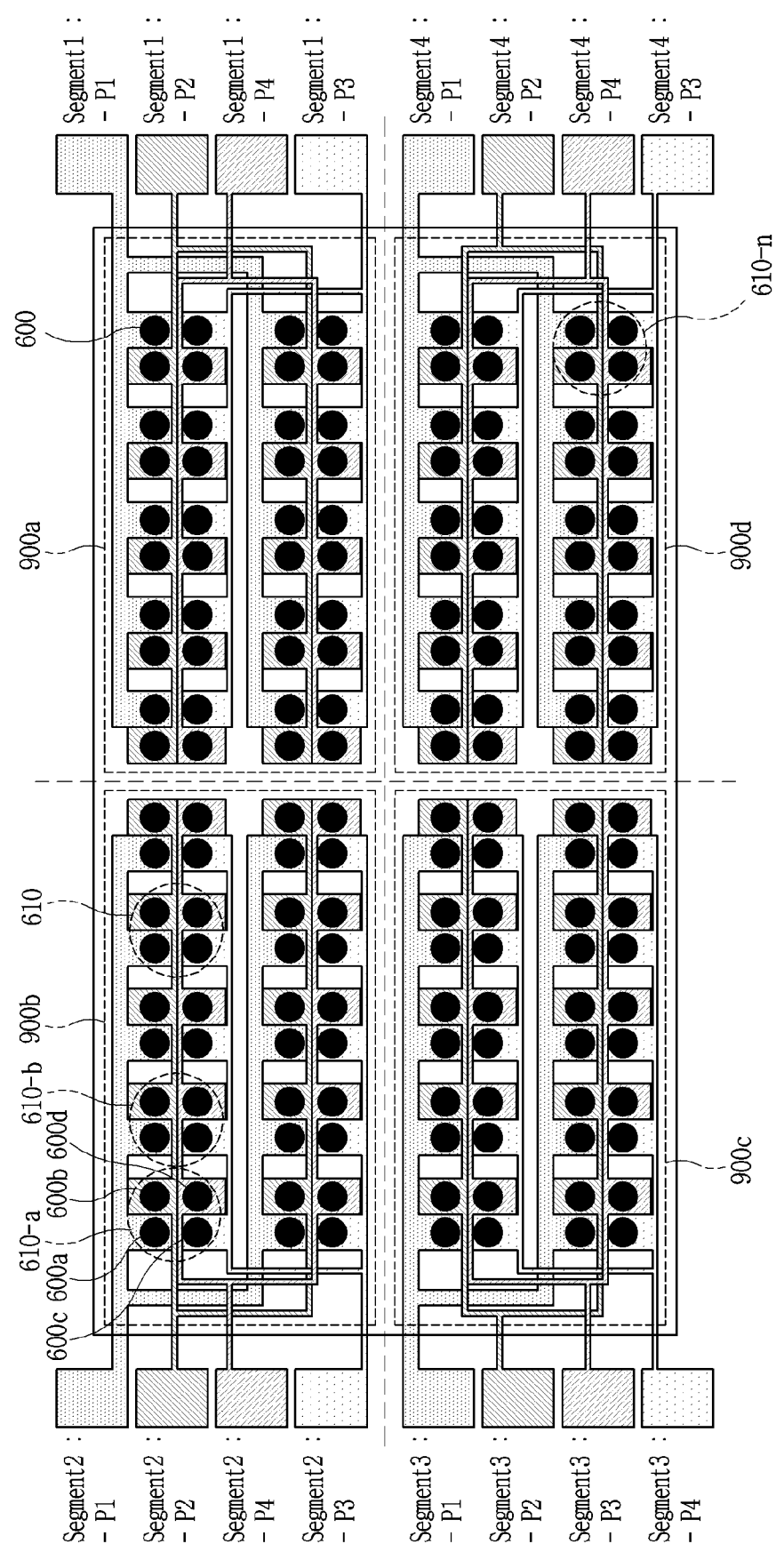

Similarly, as illustrated in FIG. 9, the controller 180 may group the plurality of groups into a plurality of units 900*a*, 900*b*, 900*c*, and 900*d*, and control the light-emitting elements to emit light for each unit without a time overlap.

In the case of FIG. 9, the controller 180 may control the light-emitting elements for each unit 900*a*, 900*b*, 900*c*, and 900*d*, in a manner of controlling the lighting unit, as illustrated in FIG. 8, such that the first to fourth light-emitting elements output light of different power for different periods of time.

As another example, in the case of FIG. 8, wavelengths 1 to 4 may be turned on/off alternately for an entire area without a segment. On the other hand, in the case of FIG. 9, the groups each outputting the wavelengths 1 to 4 may be grouped into the units (segments) 1 to 4 which may then be turned on/off alternately for each wavelength.

Accordingly, the controller 180 may control those segments such that the units (segments) 1 to 4 for power 1 are sequentially turned on, the units 1 to 4 for power 2 are sequentially turned on, the units 1 to 4 for power 3 are sequentially turned on, and then the units 1 to 4 for power 4 are sequentially turned on.

Figure 10:
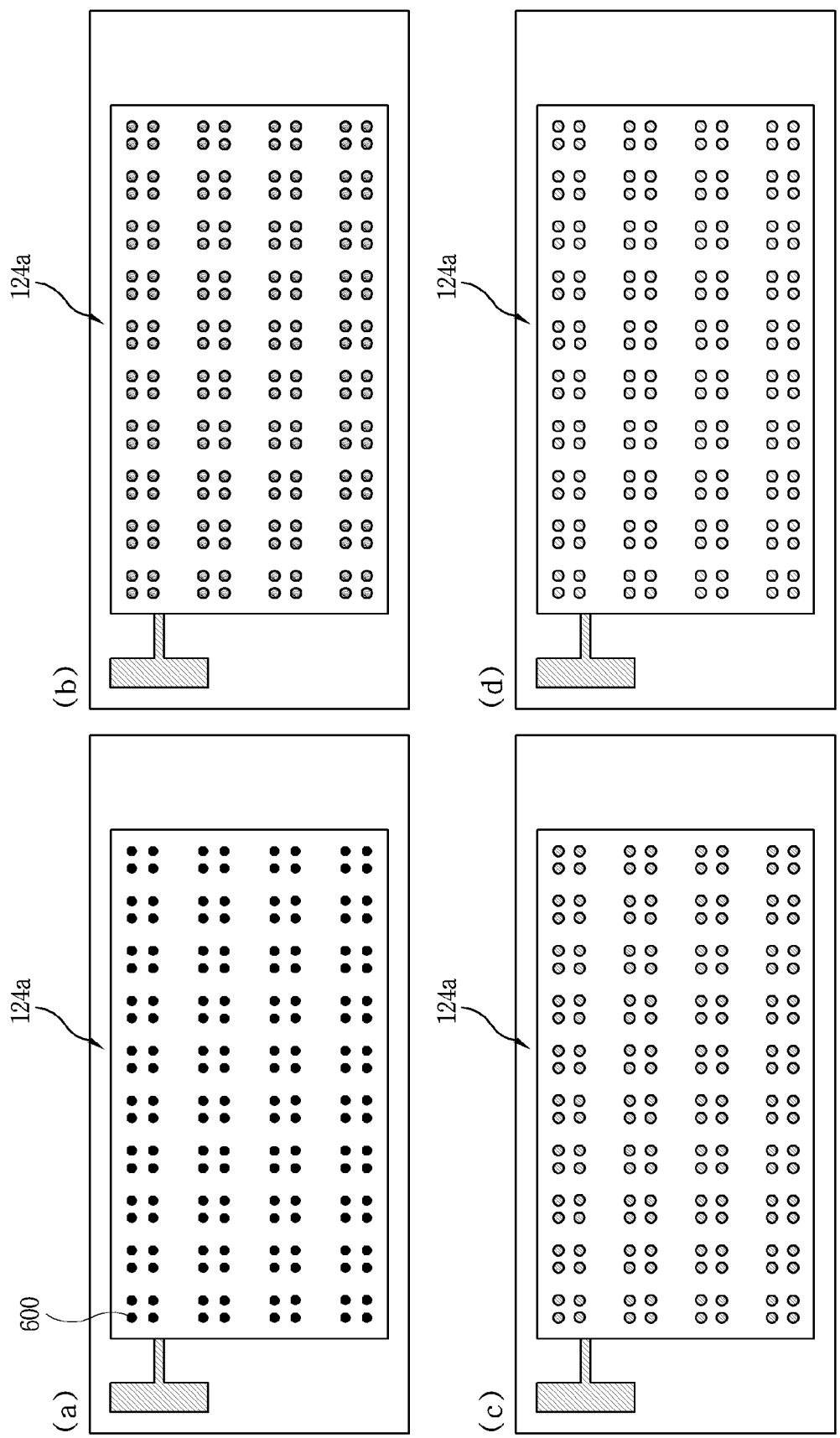

Meanwhile, as illustrated in FIG. 10, the controller 180 may control all of the plurality of light-emitting elements 600 to emit light with different power over time.

For example, as illustrated in (a) of FIG. 10, the controller 180 may control all of the plurality of light-emitting elements to emit light of first power for a first (period of) time. The controller 180, as illustrated in (b) of FIG. 10, may control all of the plurality of light-emitting elements to emit light with second power different from the first power for a second period of after the first period of time elapses.

For example, as illustrated in (a) to (d) of FIG. 10, the controller 180 may control the lighting unit 124 such that the entire light-emitting elements output light of weaker power gradually as time elapses.

The controller 180 may project light on an entire area of an object while sequentially changing power.

Unlike FIG. 6 which illustrates the structure having four physically different types of emitters with different optical power, the controller 180 may adjust power on the entire area by controlling a driver to change inputs. Therefore, only one type of emitter may be used for the entire area.

The controller 180 may control power for each (period of) time. The number of power adjustment steps may be randomly set. Not only a regular pattern but also a random pattern may be available.

Figure 11:
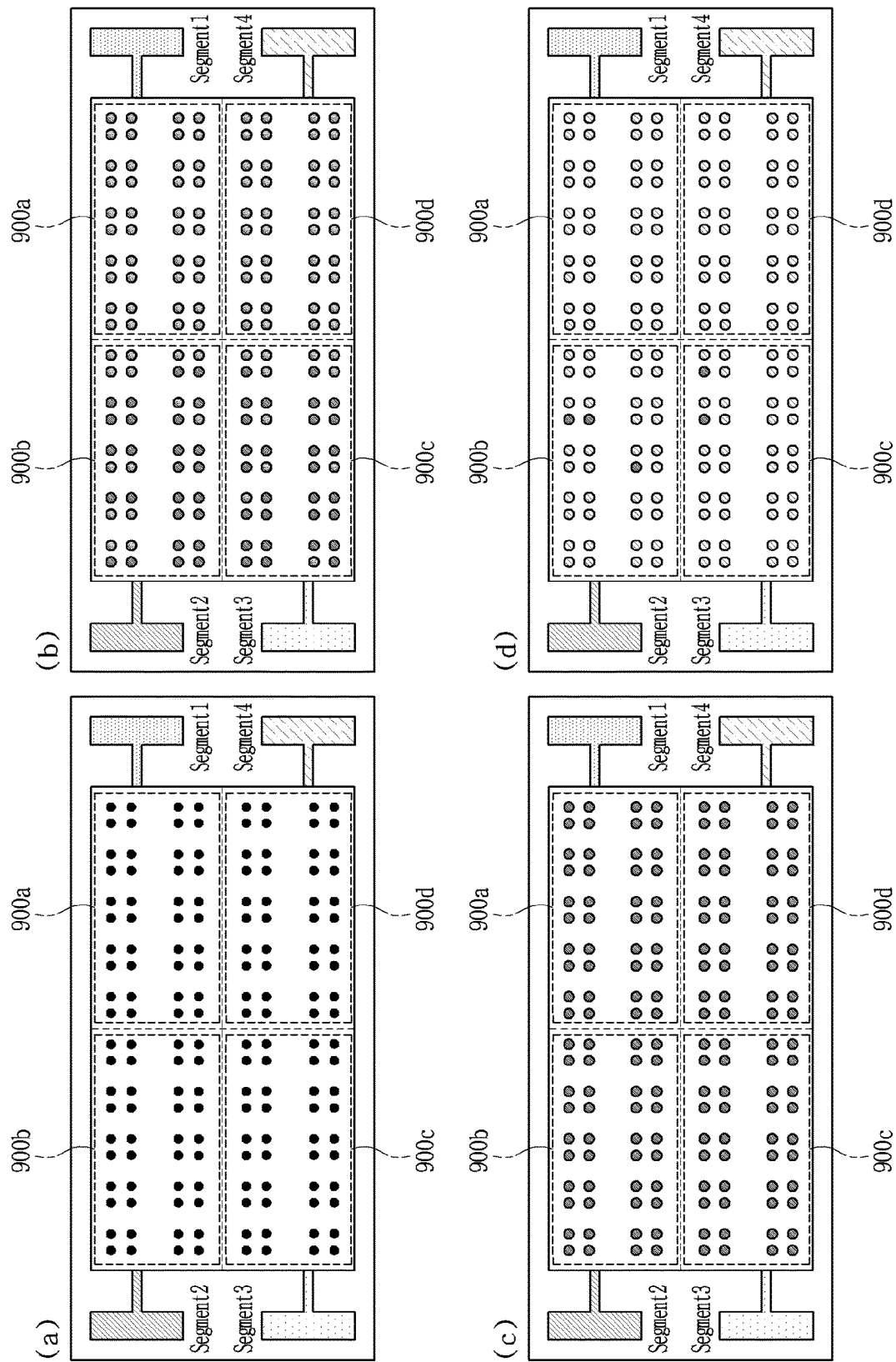
Figure 14:
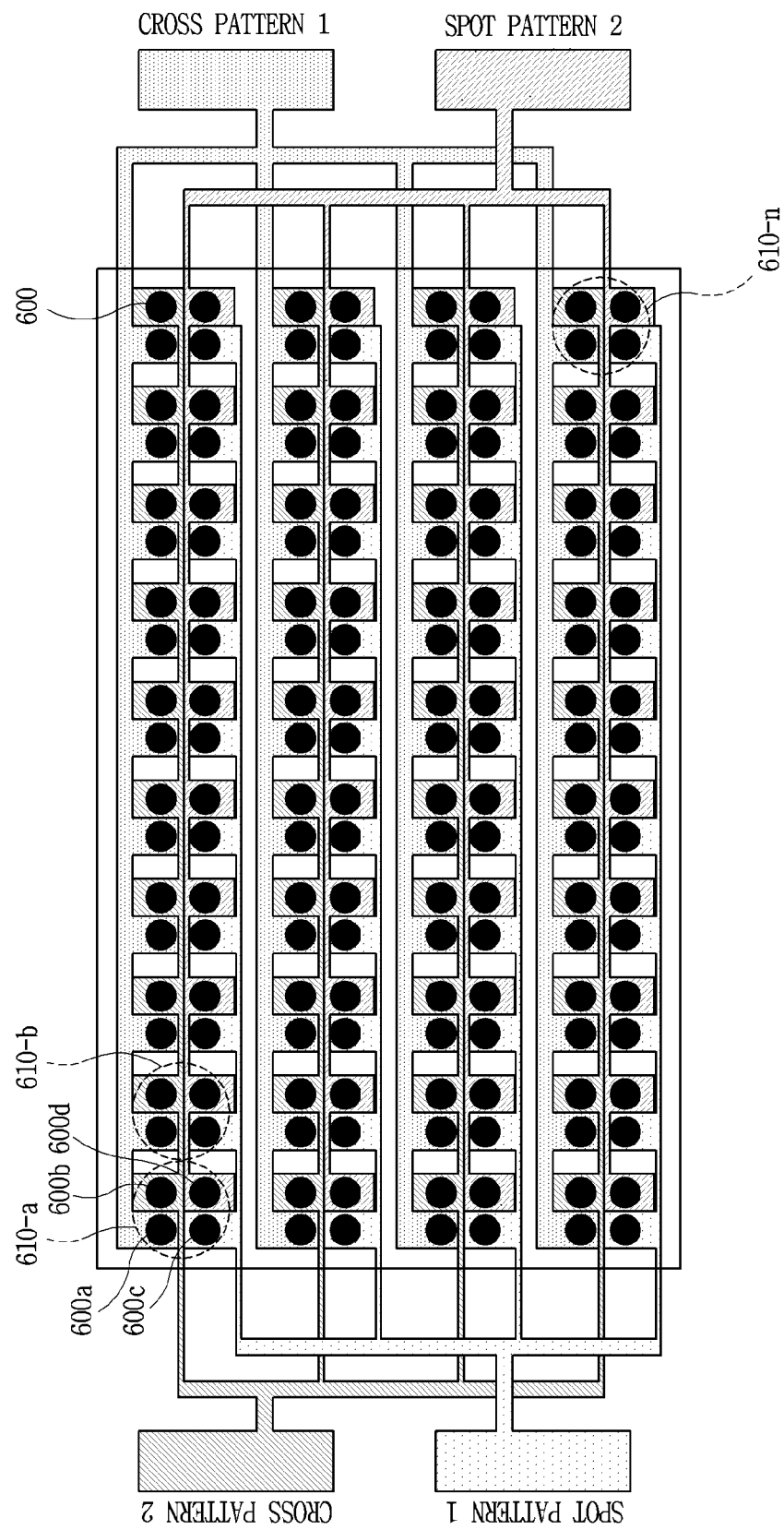

As illustrated in FIG. 11, the controller 180 may group the plurality of light-emitting elements into the plurality of units 900a, 900b, 900c, and 900d, and control the lighting unit 124 to emit light with different power for each unit on the time basis.

For example, as illustrated in (a) of FIG. 11, the controller 180 may control the lighting unit to output light sequentially for each of the plurality of units (segments) 900a, 900b, 900c, 900d, in a manner of outputting light of first power during a first sequential light emission, outputting light of second power during a second sequential light emission, outputting light of third power during a third sequential light emission, and outputting light of fourth power during a fourth sequential light emission.

The difference from the structure illustrated in FIG. 10 is that the entire area is divided into 4 segments (units). Likewise, the control unit 180 may adjust power for each segment (unit) by changing inputs. The number of segments (units) may be randomly adjusted.

On the other hand, as illustrated in FIG. 12, the controller 180 may control the lighting unit such that the first light-emitting elements 600a and the second light-emitting elements 600b included in the plurality of groups 610-a, 610-b, 610-n, respectively, emit light with different beam profiles (light distributions).

For example, Gaussian beam output from the first light-emitting elements illustrated in (a) of FIG. 13A and doughnut beam output from the second light-emitting elements (or third light-emitting elements) as illustrated in (b) of FIG. 13A may be different in beam profiles (light distributions).

The controller 180 may control the lighting unit such that the first light-emitting elements included in the plurality of groups output light (e.g., Gaussian beam) having a first beam profile and the second light-emitting elements included in the plurality of groups output light (e.g., doughnut beam) having a second beam profile.

As illustrated in (a) to (d) of FIG. 13B, the beam profile may differ depending on a type of material, and the controller 180 may determine/decide a material of a subject based on beam profiles included in images captured through the camera (sensor).

The controller 180 may determine a material of a subject by using different responses according to beam profiles of beams incident on the material.

The controller 180 may check a material/distance based on a beam profile of optical spots that light reflected for each material is received in the sensor.

The controller 180 may sequentially irradiate light beams 1 to 4 (light output from the first to fourth light-emitting elements) having different beam profiles onto an object, and acquire illumination (lighting) information accordingly.

FIGS. 12 to 13B exemplarily illustrate that the light beams 1 to 4 (light output from the first to fourth light-emitting elements) are Gaussian beam 1, Gaussian beam 2, doughnut beam 1, and doughnut beam 2, respectively. Other types of light beams may be selected.

The controller 180 may determine the material by checking the response of only one of the light beams 1 to 4 or multiple responses of the light beams 1 to 4.

Meanwhile, the controller 180 may control the lighting unit 124 so that the first light-emitting element and the second light-emitting element included in each of the plurality of groups emit light having different patterns.

For example, as illustrated (a) of FIG. 15, the controller 180 may control the first light-emitting elements to output light of a first pattern (cross pattern) to a subject, and thereafter, control the second light-emitting elements to output light of a second pattern (spot pattern) to the subject.

Similarly, the controller 180 may control the first to fourth light-emitting elements to emit light sequentially without a time overlap.

The beam profiles and the patterns described above may be different from each other in shape.

For example, even if having the same pattern (circular/elliptical pattern), beam profiles with a difference in light intensity may be formed at a center and a periphery.

The controller 180 may determine a material of a subject by using a difference in response (illumination information) according to a specific pattern of the material.

The controller 180 may sequentially irradiate light of the patterns 1 to 4 onto an object and check responses accordingly.

A material may be determined by checking a response to only one of the patterns 1 to 4 or multiple responses of the patterns 1 to 4.

The example has been given as the use of determining power for the entire area, but the present disclosure is not limited thereto, and an example of a use of segmenting the entire area and determining power for each segmented area.

The controller 180 may determine a material of an object, which exhibits a similar reflection/scattering response but is made of different materials, using AI algorithm/data based on RGB or IR raw images.

Figure 16:
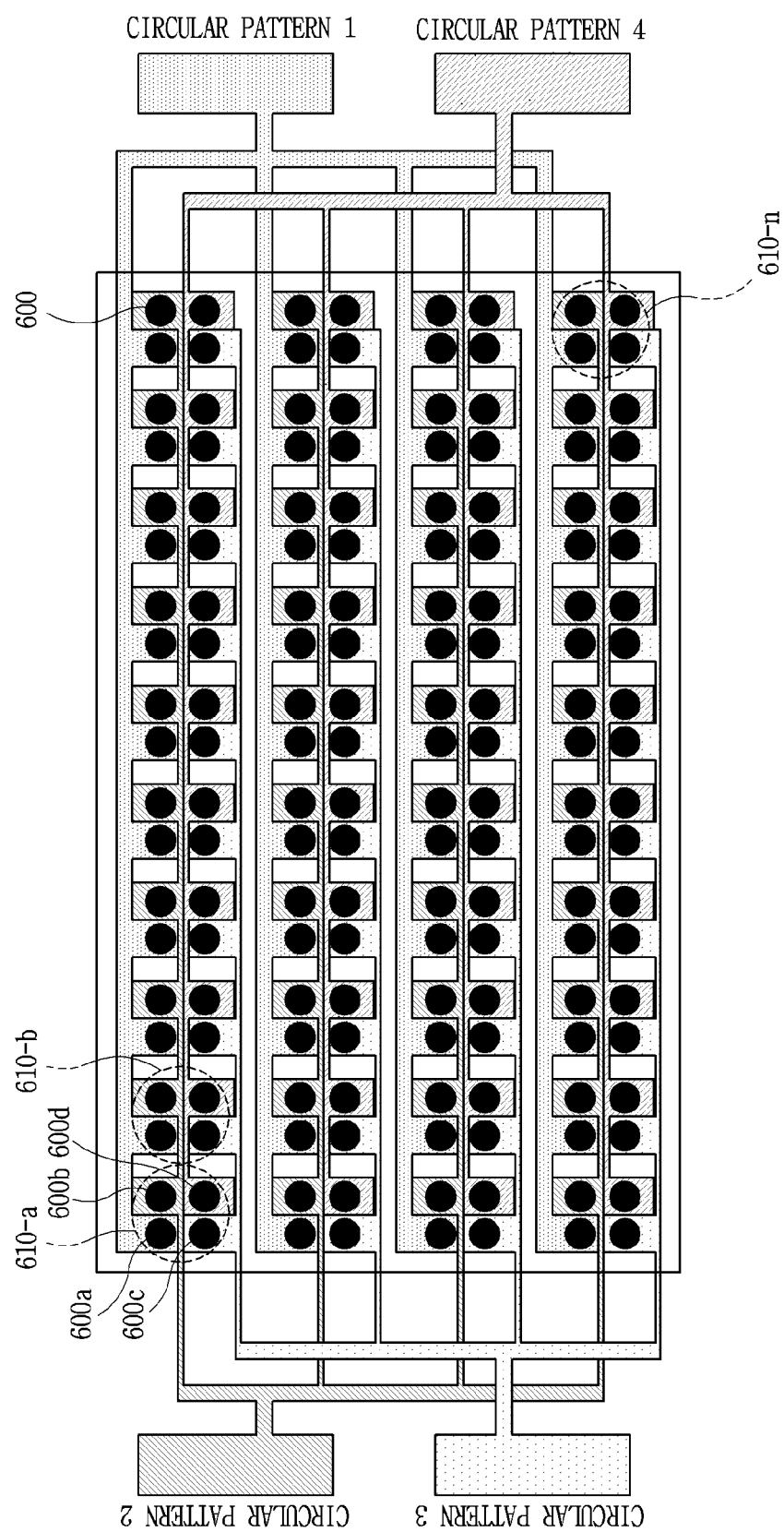

On the other hand, as illustrated in FIG. 16, the controller 180 may also control the lighting unit such that the first light-emitting elements and the second light-emitting elements included in the plurality of groups irradiate light of the same pattern with optical spots in different sizes.

For example, as illustrated in (a) of FIG. 17, the controller 180 may control the lighting unit such that the first light-emitting elements emit light of the same pattern with optical spots having a first size. On the other hand, as illustrated in (b) of FIG. 17, the controller 180 may control the lighting unit such that the second light-emitting elements emit light of the same pattern with optical spots having a second size.

The controller 180 may project a pattern having the same circular shape and different diameters (sizes) on a subject. For example, patterns were classified into circular pattern 1 (large), circular pattern 2 (large-medium), circular pattern 3 (medium), and circular pattern 4 (small). It may also be possible to generate light having different sizes in the VCSEL itself.

In this way, the controller 180 may control the lighting unit to irradiate light of different wavelengths, different power, different beam profiles, different sizes of optical spots, or different patterns, to a subject, and determine a material of the subject based on information related to illumination (or light) that is reflected from the subject and received by the sensor (camera).

Figure 18:
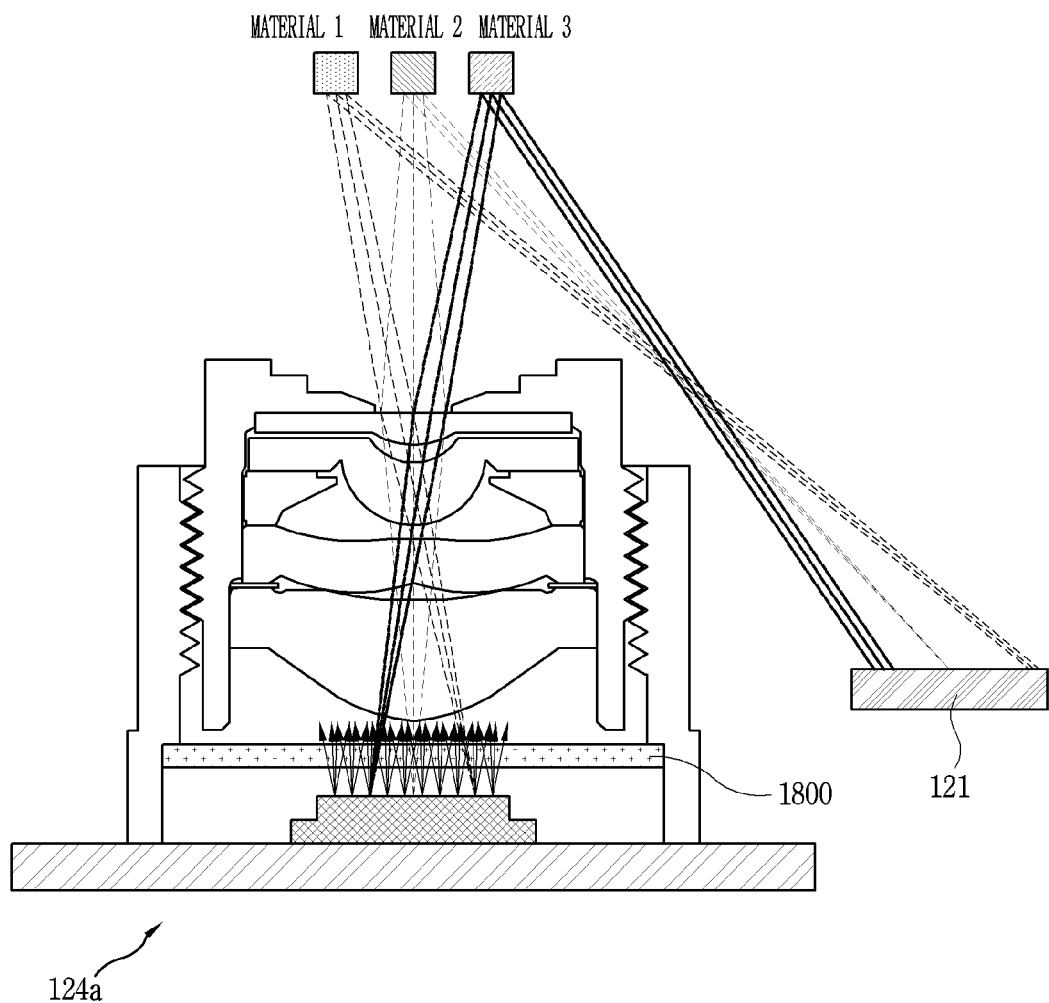

Meanwhile, as illustrated in FIG. 18, the first light source 124a may include an illumination lens (lighting lens) 1800 configured to irradiate light of different patterns.

The mobile terminal of the present disclosure may adjust a size of a light pattern projected onto an object by using the lens 1800 (or/and a diffractive element) of the lighting unit. A passive optical element may be configured by combining a diffractive element (microlens array or DOE) with a lens or may be configured independently. The passive optical element may be configured to differently adjust a size of spot projected on (reaching) an object according to a distance/material.

Figure 19:
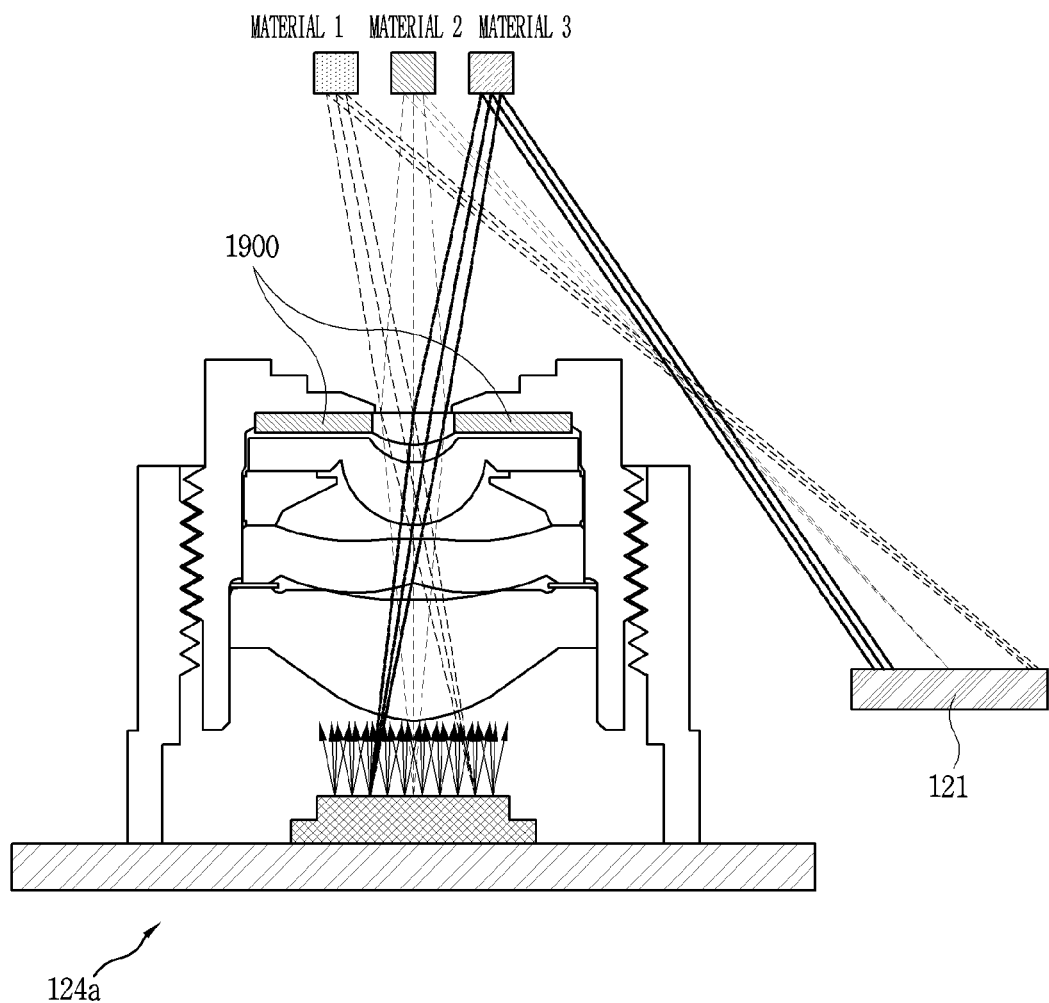

As illustrated in FIG. 19, the first light source 124a may include a variable aperture 1900 configured to irradiate light of different patterns.

In the mobile terminal of the present disclosure, the variable aperture 1900 may be provided to vary a size of a pattern in an opening/closing manner and irradiate the pattern on an object. Although light having the same size is emitted from the VCSEL, the size of a light pattern for an entire area may be adjusted by opening and closing the aperture and checking a response (illumination information) of a material.

The controller 180 may open or close the aperture by a different aperture value so as to adjust a size of a pattern. According to this method, the size of the entire pattern may be reduced or increased at the same time.

Therefore, sizes of patterns projected onto objects located at the same distance are similar, but sizes/beam profiles of spots reaching the sensor may be different depending on materials.

The controller 180 may control the variable aperture to form a specific pattern size by using the fact that a specific material has the best response to the specific pattern size.

By varying a size of a light passage area (aperture value) of the variable aperture, the controller 180 can obtain lighting (illumination) information having different reflectance according to a material, as illustrated in (a) to (c) of FIG. 20. The controller 180 may thus determine a material of a subject based on the illumination information.

Figure 21:
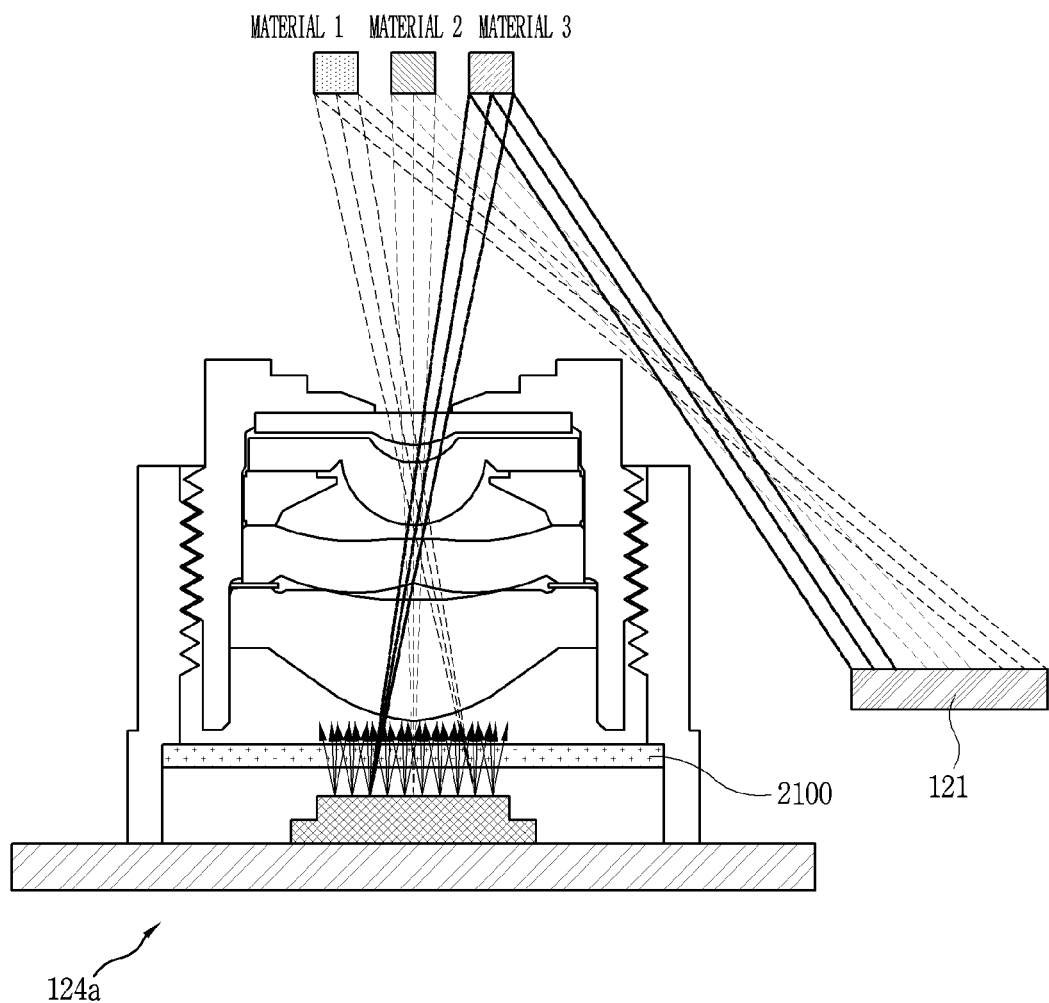

In addition, the first light source 124a may include a diffractive optical element (DOE) 2100 configured to irradiate light of different patterns, as illustrated in FIG. 21.

The first light source unit 124a of the present disclosure may duplicate input optical spots using the DOE, and sense interference pattern generated due to interference between optical spots and a material through the sensor (camera) by using coherence between the duplicated optical spots.

In the case of a VCSEL light source, light beams with different coherences are projected from several emitters. Since light from an individual emitter has its own coherence, it may produce an interference pattern when responding to a material.

The controller 180 may detect a material by duplicating optical spots passed through the same single aperture using the DOE to produce a plurality of optical spot patterns, projecting the produced optical spots on a material, and acquiring an optical pattern of reflected/scattered light beams using the sensor.

For example, the DOE may be located between the VCSEL and the lens or on a front surface of the lens. The first light source 124a may be merely provided with the VCSEL and the DOE without the lens.

In addition, as described in FIG. 5, the mobile terminal of the present disclosure may control the uniform illumination light and the pattern auxiliary light to be alternately turned on/off without an overlap.

The patterned illumination light may be inspection light irradiated on a surface of an object, and the uniform illumination light may be implemented to acquire texture information related to the object from a corresponding wavelength.

At this time, there may be three or more types of information used for determination of a material.

First, texture information related to an object itself may be acquired from information obtained during an operation of the uniform illumination light.

Second, the pattern illumination light may determine a material based on beam profile information (input light) which is known as inspection light. (Pattern changed by a material)

Third, a difference in brightness between the center and the periphery of the sensor, caused due to lens shading, can be removed by using different images acquired through emission of the uniform illumination light and the pattern auxiliary light, respectively, thereby determining a material more robustly.

The present disclosure can provide a new mobile terminal capable of determining a material of a subject to be captured by using lighting (illumination).

The present disclosure can provide a new control method capable of determining a material of a subject to be captured in an optimized manner by varying a pattern of lighting (illumination).

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A mobile terminal comprising:
a lighting unit;
a camera; and
a controller configured to:
control the lighting unit to irradiate illumination light on a subject, control the camera to capture one or more images of the subject irradiated with the illumination light, and determine a material of the subject based on information related to the illumination light irradiated on the subject, wherein the lighting unit comprises:

a first light source configured to irradiate pattern light for emitting a plurality of light beams in a preset pattern, wherein the first light source comprises a plurality of light-emitting elements grouped into a plurality of groups, wherein each of the plurality of groups comprises a same number of light-emitting elements, and wherein the controller is further configured to control the lighting unit such that a first light-emitting element and a second light-emitting element included in each of the plurality of groups irradiate light of different wavelengths.

2. The mobile terminal of claim 1, wherein the lighting unit further comprises:

a second light source configured to irradiate uniform light.

3. The mobile terminal of claim 2, wherein the controller is further configured to turn on the first light source and the second light source alternately.

4. The mobile terminal of claim 3, wherein the first light source is turned on for a first time period and the second light source is turned on for a second time period.

5. The mobile terminal of claim 1, wherein the controller is further configured to control the lighting unit such that a first light-emitting element and a second light-emitting element included in each of the plurality of groups output light with a different power.

6. The mobile terminal of claim 1, wherein the controller is further configured to control all of the plurality of light-emitting elements to emit light with a different power for different time periods.

7. The mobile terminal of claim 6, wherein the controller is further configured to:

control all of the plurality of light-emitting elements to emit light with a first power for a first time period, and control all of the plurality of light-emitting elements to emit light with a second power different from the first power for a second time period after the first time period elapses.

8. The mobile terminal of claim 1, wherein the controller is further configured to:

group the plurality of light-emitting elements into a plurality of units, and control the lighting unit to emit light with a different power based on different time periods for each of the plurality of units.

9. The mobile terminal of claim 1, wherein the first light source comprises an illumination lens configured to output light of different patterns.

10. The mobile terminal of claim 1, wherein the first light source comprises a variable aperture configured to irradiate light of different patterns.

11. The mobile terminal of claim 1, wherein the first light source comprises a diffractive optical element configured to irradiate light of different patterns.

12. A mobile terminal comprising:

a lighting unit;

a camera; and a controller configured to:

control the lighting unit to irradiate illumination light on a subject, control the camera to capture one or more images of the subject irradiated with the illumination light, and determine a material of the subject based on information related to the illumination light irradiated on the subject, wherein the lighting unit comprises:

a first light source configured to irradiate pattern light for emitting a plurality of light beams in a preset pattern, wherein the first light source comprises a plurality of light-emitting elements grouped into a plurality of groups, wherein each of the plurality of groups comprises a same number of light-emitting elements, and wherein the controller is further configured to:

group the plurality of groups into a plurality of units, and control the lighting unit to irradiate light without a time overlap of emitting light between the plurality of units.

13. The mobile terminal of claim 12, wherein each of the plurality of units comprises a same number of groups, and wherein the controller is further configured to control the lighting unit such that a unit among the plurality of units is turned on while the light-emitting elements in a remaining plurality of units do not emit light.

14. A mobile terminal comprising:

a lighting unit;

a camera; and a controller configured to:

control the lighting unit to irradiate illumination light on a subject, control the camera to capture one or more images of the subject irradiated with the illumination light, and determine a material of the subject based on information related to the illumination light irradiated on the subject, wherein the lighting unit comprises:

a first light source configured to irradiate pattern light for emitting a plurality of light beams in a preset pattern, wherein the first light source comprises a plurality of light-emitting elements grouped into a plurality of groups, wherein each of the plurality of groups comprises a same number of light-emitting elements, and wherein the controller is further configured to control the lighting unit such that a first light-emitting element and a second light-emitting element in each of the plurality of groups output light with different beam profiles.

15. A mobile terminal comprising:

a lighting unit;

a camera; and a controller configured to:

control the lighting unit to irradiate illumination light on a subject, control the camera to capture one or more images of the subject irradiated with the illumination light, and determine a material of the subject based on information related to the illumination light irradiated on the subject, wherein the lighting unit comprises:

a first light source configured to irradiate pattern light for emitting a plurality of light beams in a preset pattern, wherein the first light source comprises a plurality of light-emitting elements grouped into a plurality of groups, wherein each of the plurality of groups comprises a same number of light-emitting elements, and wherein the controller is further configured to control the lighting unit such that a first light-emitting element and a second light-emitting element in each of the plurality of groups irradiate light with different patterns.

16. A mobile terminal comprising:
a lighting unit;
a camera; and
a controller configured to:
control the lighting unit to irradiate illumination light on a subject,
control the camera to capture one or more images of the subject irradiated with the illumination light, and
determine a material of the subject based on information related to the illumination light irradiated on the subject,
wherein the lighting unit comprises:
a first light source configured to irradiate pattern light for emitting a plurality of light beams in a preset pattern, wherein the first light source comprises a plurality of light-emitting elements grouped into a plurality of groups,
wherein each of the plurality of groups comprises a same number of light-emitting elements, and
wherein the controller is further configured to control the lighting unit such that a first light-emitting element and a second light-emitting element in each of the plurality of groups irradiate light of a same pattern with optical spots in different sizes.

17. A method for controlling a mobile terminal, the method comprising:
irradiating illumination light on a subject captured using a camera;
capturing the subject irradiated with the illumination light;
determining a material of the subject based on information related to the illumination light irradiated to the subject;
irradiating pattern light, by a first light source, by emitting a plurality of light beams in a preset pattern, wherein the first light source comprises a plurality of light-emitting elements grouped into a plurality of groups,
wherein each of the plurality of groups comprises a same number of light-emitting elements, and
irradiating light of different wavelengths using a first light-emitting element and a second light-emitting element included in each of the plurality of groups.

* * * * *